United States Patent
Katori

(10) Patent No.: US 10,524,578 B2
(45) Date of Patent: Jan. 7, 2020

(54) CONVEYANCE SEAT

(71) Applicant: TS Tech Co., Ltd., Saitama (JP)

(72) Inventor: Takayoshi Katori, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 44 days.

(21) Appl. No.: 15/776,877

(22) PCT Filed: Nov. 17, 2016

(86) PCT No.: PCT/JP2016/084152
§ 371 (c)(1),
(2) Date: May 17, 2018

(87) PCT Pub. No.: WO2017/086398
PCT Pub. Date: May 26, 2017

(65) Prior Publication Data
US 2018/0338620 A1    Nov. 29, 2018

(30) Foreign Application Priority Data

Nov. 20, 2015  (JP) .................................. 2015-228184
Dec. 10, 2015  (JP) .................................. 2015-241588
Dec. 10, 2015  (JP) .................................. 2015-241589

(51) Int. Cl.
*B60N 2/06*     (2006.01)
*B60N 2/22*     (2006.01)
(Continued)

(52) U.S. Cl.
CPC .......... *A47C 7/5068* (2018.08); *B60N 2/0232* (2013.01); *B60N 2/62* (2013.01); *B60N 2/90* (2018.02); *B60N 3/06* (2013.01)

(58) Field of Classification Search
CPC ..... A47C 7/506; A47C 1/0342; A47C 1/0345; A47C 1/035; A47C 1/0355; A47C 7/50;
(Continued)

(56) References Cited

U.S. PATENT DOCUMENTS

| | | | | |
|---|---|---|---|---|
| 9,849,809 B2 * | 12/2017 | Watanabe | ................ | B60N 2/06 |
| 2013/0300177 A1 * | 11/2013 | Yamada | ................... | B60N 2/90 |
| | | | | 297/423.19 |

(Continued)

FOREIGN PATENT DOCUMENTS

| | | |
|---|---|---|
| JP | H3-9648 U | 1/1991 |
| JP | 2000-004981 A | 1/2000 |

(Continued)

OTHER PUBLICATIONS

International Search Report dated Feb. 14, 2017 for PCT Application No. PCT/JP2016/084152.
(Continued)

*Primary Examiner* — Shin H Kim
(74) *Attorney, Agent, or Firm* — Michael Best & Friedrich LLP

(57) ABSTRACT

A conveyance seat for reducing the degree of rattling includes a link group for switching a state of an ottoman, an advancing/retreating member for moving straight while advancing/retreating for moving each link, and a tip end receiver attached to a tip end portion of the advancing/retreating member and for receiving drive force of the advancing/retreating member to transmit the drive force to the link group, which includes a sub-link assembled to one of two crosslinks via a rivet and for swinging by the transmitted drive force. In a case where a first trajectory upon rotation of a fixing portion of the tip end portion of the advancing/retreating member about the point of support in rotation and a second trajectory upon rotation of a portion of the sub-link about the rivet are projected onto a virtual plane perpendicular to an axial direction of the rivet, both trajectories cross each other.

8 Claims, 26 Drawing Sheets

(51) Int. Cl.
*A47C 7/50* (2006.01)
*B60N 2/90* (2018.01)
*B60N 3/06* (2006.01)
*B60N 2/02* (2006.01)
*B60N 2/62* (2006.01)

(58) Field of Classification Search
CPC .......... B60N 2/995; B60N 3/063; B60N 2/62; B60N 2/062
USPC ..................................................... 297/423.19
See application file for complete search history.

(56) References Cited

U.S. PATENT DOCUMENTS

| | | | | |
|---|---|---|---|---|
| 2014/0021765 A1* | 1/2014 | Suzuki | .................. | B60N 2/995 297/423.19 |
| 2015/0028647 A1* | 1/2015 | LaPointe | ................. | A47C 3/02 297/423.29 |
| 2015/0061343 A1* | 3/2015 | Duncan | .................... | B60N 2/62 297/423.19 |
| 2015/0272335 A1* | 10/2015 | Lawson | ................. | A47C 7/506 297/423.19 |
| 2015/0306978 A1* | 10/2015 | Watanabe | ................ | B60N 2/06 297/344.1 |

FOREIGN PATENT DOCUMENTS

| | | |
|---|---|---|
| JP | 2000-201772 A | 7/2000 |
| JP | 2005-124657 A | 5/2005 |
| JP | 2006-305212 A | 11/2006 |
| JP | 2013-244936 A | 12/2013 |

OTHER PUBLICATIONS

Japanese Office Action dated May 21, 2019 for the corresponding Japanese Patent Application No. 2015-241588, with machine translation.

Japanese Office Action dated May 21, 2019 for the corresponding Japanese Patent Application No. 2015-241589, with machine translation.

* cited by examiner

FRONT ←——→ BACK

FIG. 8
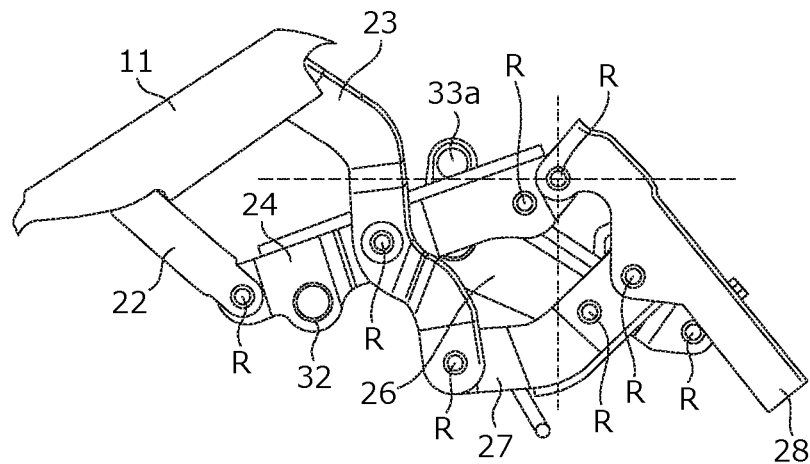
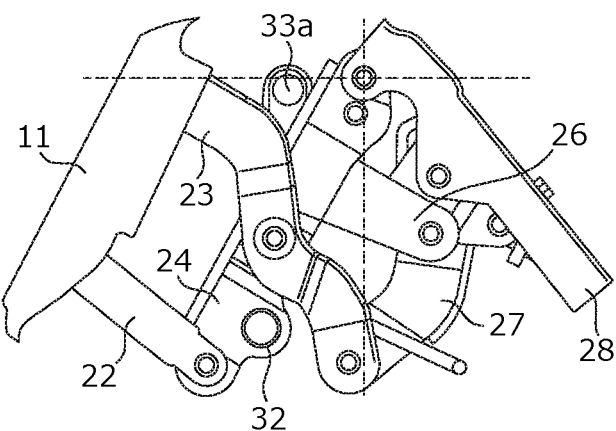
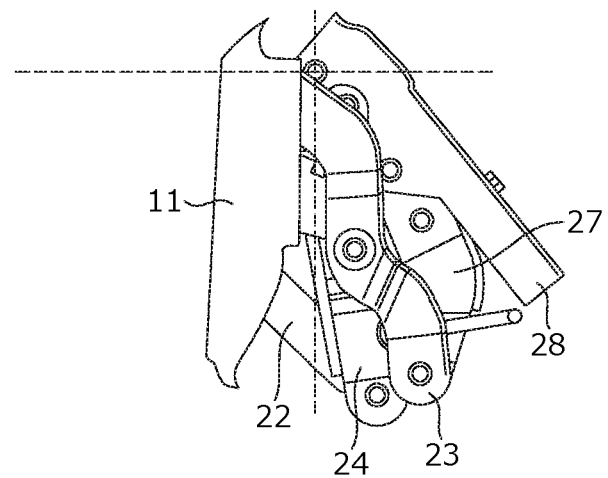

FIG. 9
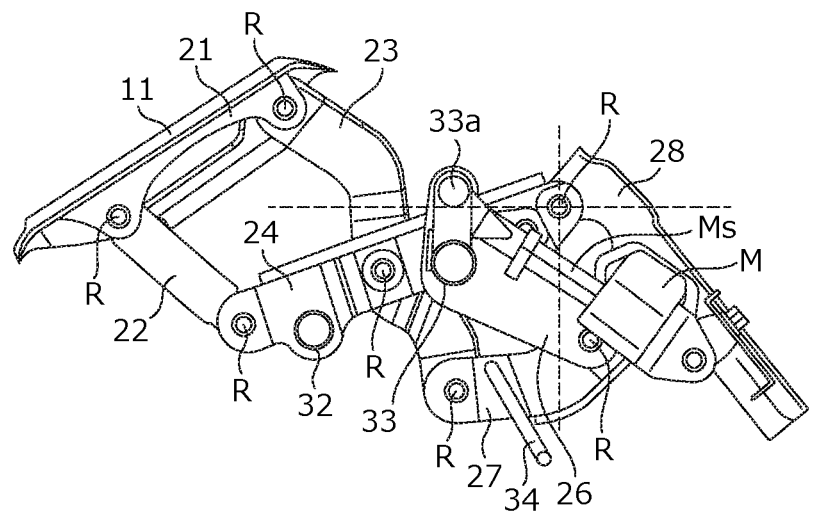
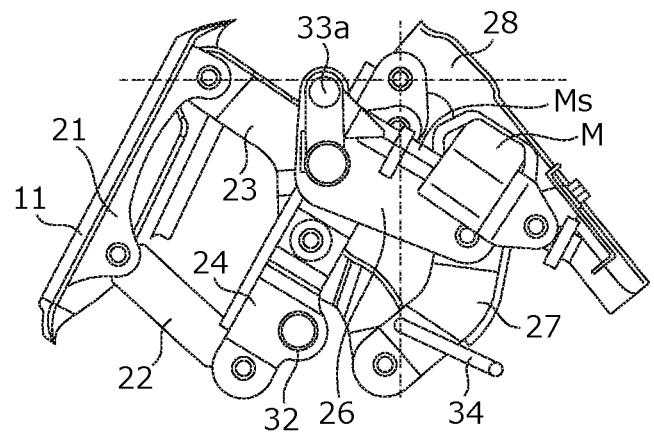
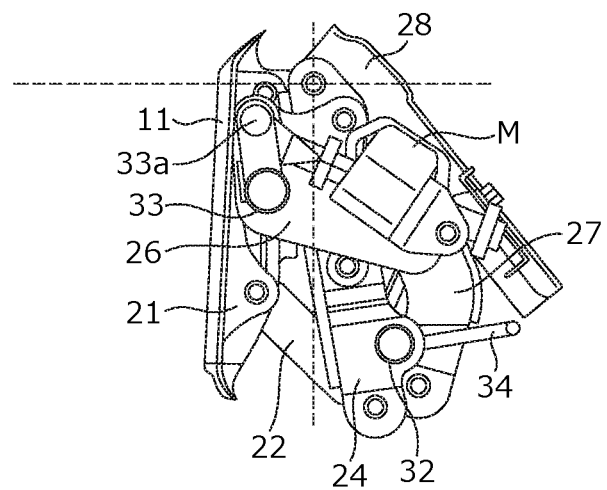

INSIDE ⟵-----⟶ OUTSIDE

CONVEYANCE SEAT

CROSS-REFERENCE TO RELATED APPLICATIONS

This application is entering into national phase of PCT Application Number PCT/JP2016/084152, filed on Nov. 17, 2016. Further, this application claims the benefit of priority from Japanese Application Number 2015-228184, filed on Nov. 20, 2015, Japanese Application Number 2015-241588, filed on Dec. 10, 2015, and Japanese Application Number 2015-241589, filed on Dec. 10, 2015, the contents of which are incorporated herein by reference.

TECHNICAL FIELD

The present invention relates to a conveyance seat, and particularly relates to a conveyance seat capable of operating multiple links to switch a state of a seat main body.

BACKGROUND ART

A conveyance seat capable of switching a state of a seat main body has been already known. One example of the conveyance seat includes a conveyance seat including multiple movable members such as rotary links and capable of operating each of the multiple movable members to switch the state of the seat main body (see, e.g., Patent Literature 1).

The conveyance seat described in Patent Literature 1 will be described. Such a conveyance seat is a vehicle seat including a retractable/expandable ottoman. Moreover, a link mechanism including multiple links is provided between the ottoman and a seat cushion. The link mechanism includes a fixing link, a front link, a rear link, an upper link, and a drive unit. Further, the drive unit has a motor and a feed screw movable in an axial direction by drive force of the motor, and couples the fixing link and the upper link together.

In the conveyance seat of Patent Literature 1 configured as described above, the motor is actuated to move the feed screw in the axial direction, thereby moving each link. As a result, a state of the ottoman is switched by moving operation of each link, and specifically, is switchable between a housing state and a use state (a state in which the ottoman supports the lower thighs of a seated person).

CITATION LIST

Patent Literature

PATENT LITERATURE 1: JP2013-244936A

SUMMARY OF INVENTION

Technical Problem

In the conveyance seat described in Patent Literature 1, the feed screw is used as a member operable to move straight to operate the multiple links. However, a member (an advancing/retreating member) configured to move straight while advancing/retreating with a tip end portion being fixed to the link or a member coupled to the link might be used as a member corresponding to the above-described feed screw. In this case, the advancing/retreating member advances/retreats to transmit drive force of the advancing/retreating member to each link, and as a result, each link moves.

Note that in the above-described configuration, there is a probability that rattling occurs between the tip end portion of the advancing/retreating member and the member fixed to the tip end portion. Particularly, in a case where the direction of straight movement of the advancing/retreating member is inclined with respect to the horizontal direction or the vertical direction, the tip end portion of the advancing/retreating member is easily swingable, and for this reason, the above-described rattling becomes more notable. Meanwhile, the degree of rattling (runout) upon occurrence of the above-described rattling depends on a movable area of the tip end portion of the advancing/retreating member, and tendency shows that a broader movable area results in a higher degree of rattling.

For this reason, the present invention has been made in view of the above-described problem, and an object of the present invention is to provide a conveyance seat capable of narrowing a movable area of a tip end portion of an advancing/retreating member to reduce the degree of rattling at the tip end portion.

Solution to Problem

The above-described problem is solved by the conveyance seat of the present invention. The conveyance seat includes multiple links configured to move to switch a state of a seat main body, an advancing/retreating member configured to move straight while advancing/retreating for moving each link, and a drive force receiver attached to a tip end portion of the advancing/retreating member and configured to receive drive force of the advancing/retreating member to transmit the drive force to the multiple links. The multiple links include two crosslinks crossing each other in a state allowing relative rotation, and an auxiliary link assembled to one crosslink of the two crosslinks via a rotary shaft and configured to swing by the transmitted drive force. When a rotation trajectory upon rotation of a fixing portion, which is fixed to the drive force receiver, of the tip end portion of the advancing/retreating member about the point of support in rotation is a first trajectory and a rotation trajectory upon rotation of a portion of the auxiliary link about the rotary shaft is a second trajectory, in a case where both of the first trajectory and the second trajectory are projected onto a virtual plane perpendicular to an axial direction of the rotary shaft, both of the first trajectory and the second trajectory cross each other.

In the conveyance seat of the present invention configured as described above, the multiple links includes the two crosslinks crossing each other, and the auxiliary link assembled to the one crosslink via the rotary shaft. The rotation trajectory upon rotation of the fixing portion, which is fixed to the drive force receiver, of the tip end portion of the advancing/retreating member about the point of support in rotation is the first trajectory. Moreover, the rotation trajectory upon rotation of the portion of the auxiliary link about the rotary shaft is the second trajectory. When both of the first trajectory and the second trajectory are projected onto the virtual plane perpendicular to the axial direction of the rotary shaft, both of these trajectories cross each other. With such a configuration, a region (a movable area) where the tip end portion of the advancing/retreating member is movable is limited to the area of the first trajectory traversing the second trajectory. As a result, the movable area of the tip end portion of the advancing/retreating member can be narrowed, and therefore, the degree of rattling at the tip end portion of the advancing/retreating member can be reduced.

In the above-described conveyance seat, the multiple links may move to switch a state of an ottoman forming the seat main body and configured to support the lower thighs of a seated person between a use state and a housing state, and groups of the multiple links may be, one by one, arranged with a clearance in a width direction of the conveyance seat.

With the above-described configuration, the degree of rattling at the tip end portion of the advancing/retreating member operable to move straight can be reduced in the conveyance seat capable of switching the state of the ottoman by operation of the multiple links.

In the above-described conveyance seat, the multiple links may include a first opposing link assembled to the one crosslink and facing the other crosslink of the two crosslinks along the other crosslink when the state of the ottoman is the use state, a second opposing link assembled to the other crosslink and facing the one crosslink along the one crosslink when the state of the ottoman is the use state, a first sub-link coupled to the drive force receiver and configured to swing by the transmitted drive force, and a second sub-link as the auxiliary link positioned adjacent to the first sub-link in the width direction and configured to swing together with the first sub-link.

In the above-described configuration, the multiple links include four links forming a pantograph mechanism, and two sub-links. With these two sub-links, the movable area of the tip end portion of the advancing/retreating member can be narrowed, and the degree of rattling at the tip end portion of the advancing/retreating member can be reduced.

In the above-described conveyance, the first sub-link may be assembled to the second opposing link via a second rotary shaft. When a rotation trajectory upon rotation of a portion, which is adjacent to the fixing portion in the width direction, of the first sub-link about the second rotary shaft is a third trajectory, in a case where the first trajectory, the second trajectory, and the third trajectory are projected onto the virtual plane, the first trajectory and the third trajectory may partially overlap with each other, and the second trajectory may cross an area of the first trajectory overlapping with the third trajectory.

In the above-described configuration, when the rotation trajectory upon rotation of the portion, which is adjacent to the tip end portion of the advancing/retreating member (precisely, the fixing portion), of the first sub-link about the second rotary shaft is the third trajectory, the first trajectory and the third trajectory projected onto the above-described virtual plane partially overlap with each other. Moreover, the second trajectory projected onto the virtual plane crosses the area where the first trajectory and the third trajectory overlap with each other. Thus, the movable area of the tip end portion of the advancing/retreating member can be more effectively narrowed.

The above-described conveyance seat may further include a coupling member configured to couple the first sub-link of the multiple links arranged on one end side in the width direction and the first sub-link of the multiple links arranged on the other end side in the width direction, and the drive force receiver may be fixed onto an outer peripheral surface of the coupling member.

In the above-described configuration, the drive force receiver is fixed onto the outer peripheral surface of the coupling member. That is, the drive force receiver is arranged in a space among the multiple links arranged on one end side in the width direction and the multiple links arranged on the other end side in the width direction. With such a configuration, the arrangement space of the drive force receiver can be saved.

The above-described conveyance seat may further include a motor configured to advance/retreat the advancing/retreating member. The advancing/retreating member may be a rod-shaped member, the advancing/retreating member moving straight diagonally upward to the front upon advancing and moving straight diagonally downward to the back upon retreating.

In the above-described configuration, the advancing/retreating member includes the rod-shaped member, and is driven by the motor to advance/retreat in the diagonal direction. In such a configuration, the tip end portion of the advancing/retreating member is more easily swingable, and therefore, rattling more easily occurs at the tip end portion. For this reason, in the above-described configuration, the advantageous effect of the present invention, i.e., the effect of providing the auxiliary link to narrow the movable area of the tip end portion of the advancing/retreating member to reduce the degree of rattling is more notably provided.

In the above-described conveyance seat, when the state of the ottoman is the use state, the drive force receiver may be positioned upward with respect to the motor.

In the above-described configuration, when the state of the ottoman is the use state, the drive force receiver is positioned upward with respect to the motor. That is, when the state of the ottoman is the use state, the tip end portion of the advancing/retreating member is positioned upward with respect to the rotation support point of the advancing/retreating member. Thus, when the advancing/retreating member advances/retreats to move the multiple links to switch the state of the ottoman from the housing state to the use state, the tip end portion of the advancing/retreating member is easily swingable, and therefore, rattling more easily occurs at the tip end portion. For this reason, in the above-described configuration, the advantageous effect of the present invention, i.e., the effect of providing the auxiliary link to narrow the movable area of the tip end portion of the advancing/retreating member to reduce the degree of rattling is much more notably provided.

The above-described conveyance seat may further include a one-end-side attachment bracket arranged on one end side in the width direction and provided to attach the multiple links to a seat cushion, an other-end-side attachment bracket arranged on the other end side in the width direction and provided to attach the multiple links to the seat cushion, and a motor fixing bracket arranged between the one-end-side attachment bracket and the other-end-side attachment bracket in the width direction. The motor may be fixed to the motor fixing bracket.

In the above-described configuration, the motor fixing bracket is provided between the one-end-side attachment bracket and the other-end-side attachment bracket, and the motor is fixed to the motor fixing bracket. Thus, the space among the multiple links provided on one end side in the width direction and the multiple links provided on the other end side in the width direction can be utilized to fix (arrange) the motor, and therefore, the arrangement space of the motor can be saved.

Advantageous Effects of Invention

According to the present invention, the movable area of the tip end portion of the advancing/retreating member can be narrowed, and therefore, the degree of rattling at the tip end portion of the advancing/retreating member can be reduced.

Moreover, according to the present invention, the degree of rattling at the tip end portion of the advancing/retreating member operable to move straight can be reduced in the configuration of switching the state of the ottoman by operation of the multiple links.

Further, according to the present invention, the two sub-links are provided. Thus, the movable area of the tip end portion of the advancing/retreating member can be narrowed, and the degree of rattling at the tip end portion of the advancing/retreating member can be effectively reduced.

In addition, according to the present invention, the movable area of the tip end portion of the advancing/retreating member can be more effectively narrowed.

Moreover, according to the present invention, the arrangement space of the drive force receiver can be saved.

Further, according to the present invention, the configuration in which the advancing/retreating member including the rod-shaped member is driven by the motor to advance/retreat in the diagonal direction is employed, and therefore, the advantageous effect of the present invention is more notably provided.

In addition, according to the present invention, when the advancing/retreating member advances/retreats to move the multiple links to switch the state of the ottoman from the housing state to the use state, rattling more easily occurs at the tip end portion of the advancing/retreating member. Thus, the advantageous effect of the present invention is much more notably provided.

Moreover, according to the present invention, the arrangement space of the motor can be saved.

BRIEF DESCRIPTION OF DRAWINGS

FIG. 8 is a view of an operation example of the link group from a direction indicated by an arrow in FIG. 7.

FIG. 9 is a view of an operation example of the link group, FIG. 9 illustrating a section along an A-A line of FIG. 7.

DESCRIPTION OF EMBODIMENTS

Hereinafter, one embodiment (the present embodiment) of the present invention will be described. Note that the embodiment described below will be set forth merely as an example for the sake of easy understanding of the present invention, and is not intended to limit the present invention. That is, changes or modifications can be made without departing from the gist of the present invention, and needless to say, the present invention includes equivalents thereof.

Moreover, a vehicle seat S will be described as an example of a conveyance seat according to the present embodiment. Note that the present invention is also applicable to other conveyance seats than the vehicle seat, i.e., seats mounted on other conveyances (e.g., ships and airplanes) than a vehicle.

As a side note, a "front-to-back direction" in description below means a front-to-back direction of the vehicle seat S, and specifically, is a direction coincident with a vehicle travelling direction. Moreover, a width direction means a width direction of the vehicle seat S, and specifically, is a direction coincident with a vehicle horizontal width direction (a right-to-left direction).

Figure 1:
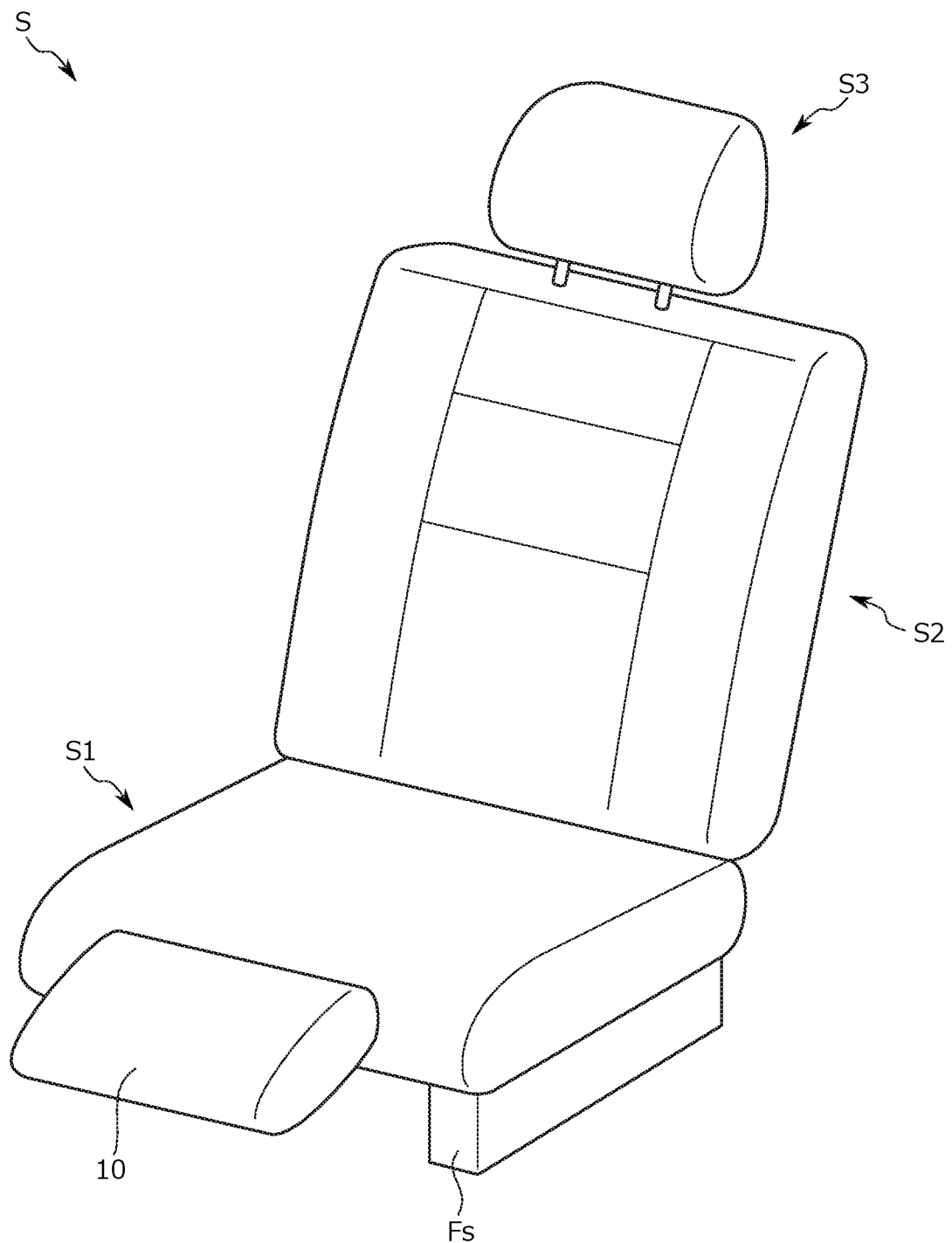
FIG. 1 is a view of the entirety of a conveyance seat according to one embodiment of the present invention.

First, an outline of a basic configuration of the vehicle seat S according to the present embodiment will be described with reference to FIG. 1. As illustrated in FIG. 1, the vehicle seat S according to the present embodiment includes a seat cushion S1 configured to support the buttocks of a seated person from below, a seat back S2 on which the back of the seated person leans, and a headrest S3 configured to support the head of the seated person from the back. A configuration of each of the seat cushion S1, the seat back S2, and the headrest S3 is similar to a well-known configuration, and therefore, description thereof will not be made.

Note that the seat cushion S1 according to the present embodiment includes a side cover Fs at each end portion in the width direction as illustrated in FIG. 1. The side cover Fs is a resin cover configured to cover, from the lateral side, a side frame provided at each end portion of a not-shown seat cushion frame in the width direction, the seat cushion frame forming a framework of the seat cushion S1.

Moreover, the vehicle seat S according to the present embodiment includes an ottoman 10 arranged forward with respect to the seat cushion S1 as illustrated in FIG. 1. The ottoman 10 is configured to support, from below, the lower thighs of the seated person in the front of the seat cushion S1, and the ottoman 10, the seat cushion S1, the seat back S2, and the headrest S3 together form a seat main body.

Figure 2:
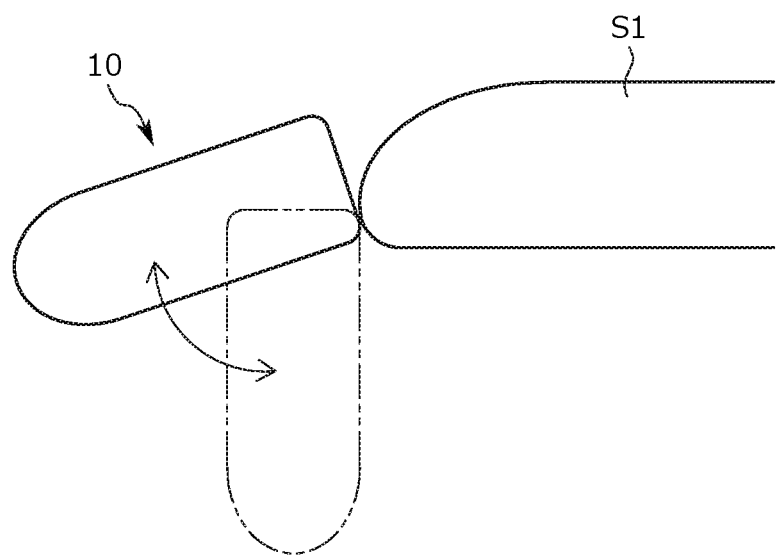
FIG. 2 is a view for describing switching of a state of an ottoman.

Further, the ottoman 10 is capable of moving (precisely, rotating) in an upper-to-lower direction and the front-toback direction. With this configuration, a state of the ottoman 10 is switchable between a state (i.e., a use state) in which the ottoman 10 is at a position indicated by a solid line in FIG. 2 and a state (i.e., a housing state) in which the ottoman 10 is at a position indicated by a dashed line in FIG. 2. The "use state" is a state in which the ottoman 10 can support the lower thighs of the seated person, and specifically, is a state in which a back end of the ottoman 10 is at the substantially same height as that of a front end portion of the seat cushion S1 in the upper-to-lower direction and a front end of the ottoman 10 is somewhat lower than the back end of the ottoman 10. The "housing state" is a state in which the ottoman 10 is retracted from the position in the use state toward the front end portion of the seat cushion S1, and specifically, is a state in which the ottoman 10 suspends at a position right in the front of the seat cushion S1. Note that in description below, a "use position" is a position when the ottoman 10 is in the use state, and a "housing position" is a position when the ottoman 10 is in the housing state.

Figure 3:
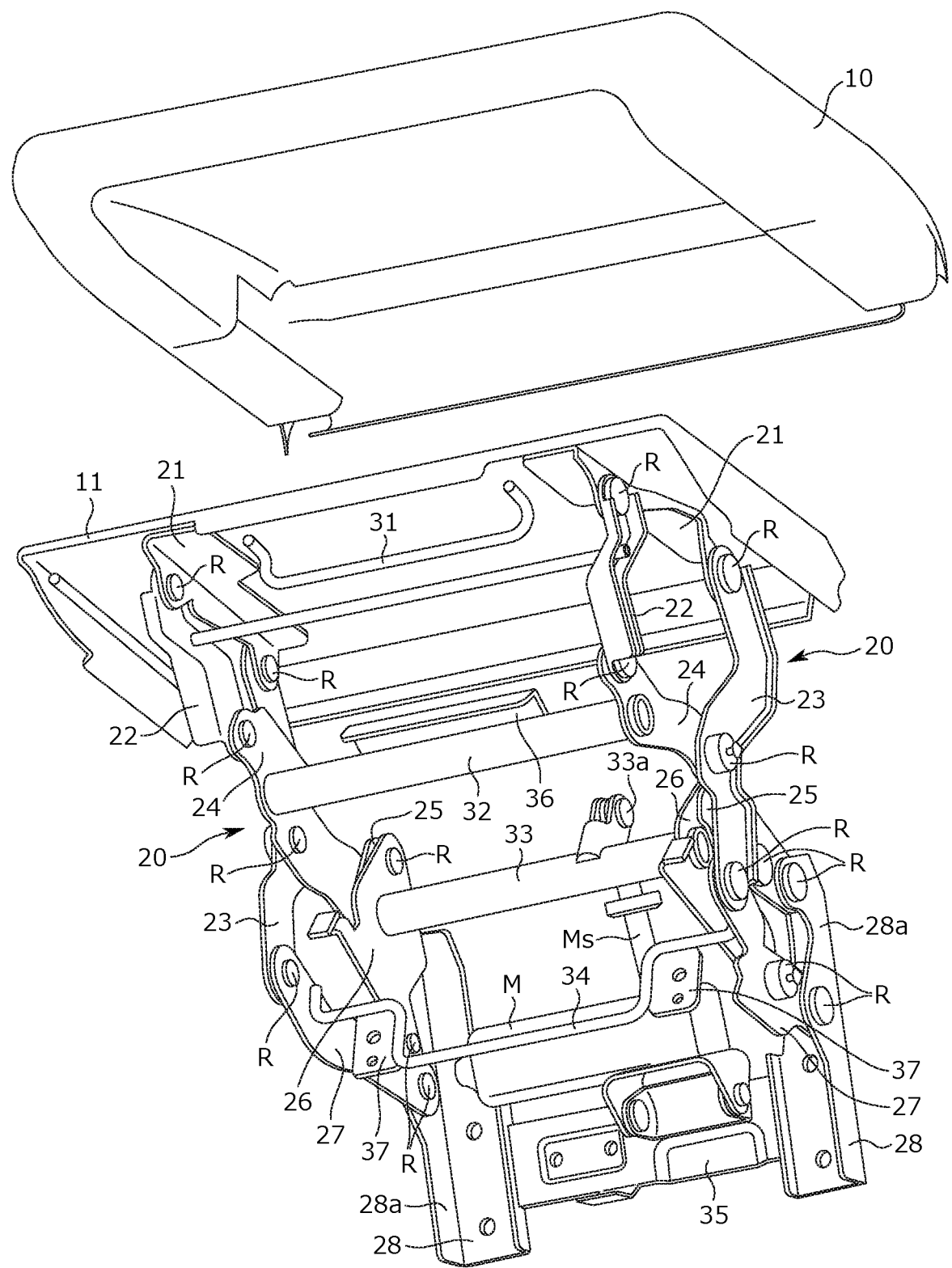
FIG. 3 is a view of the ottoman and link groups.

The vehicle seat S according to the present embodiment has, as peripheral equipment of the ottoman 10, link groups 20 illustrated in FIG. 3. The link group 20 corresponds to multiple links, and is movable to switch the state of the ottoman 10 as part of the seat main body between the use state and the housing state. Moreover, in the present embodiment, the link groups 20 in a pair are arranged with a clearance in the width direction as illustrated in FIG. 3.

Figure 4:
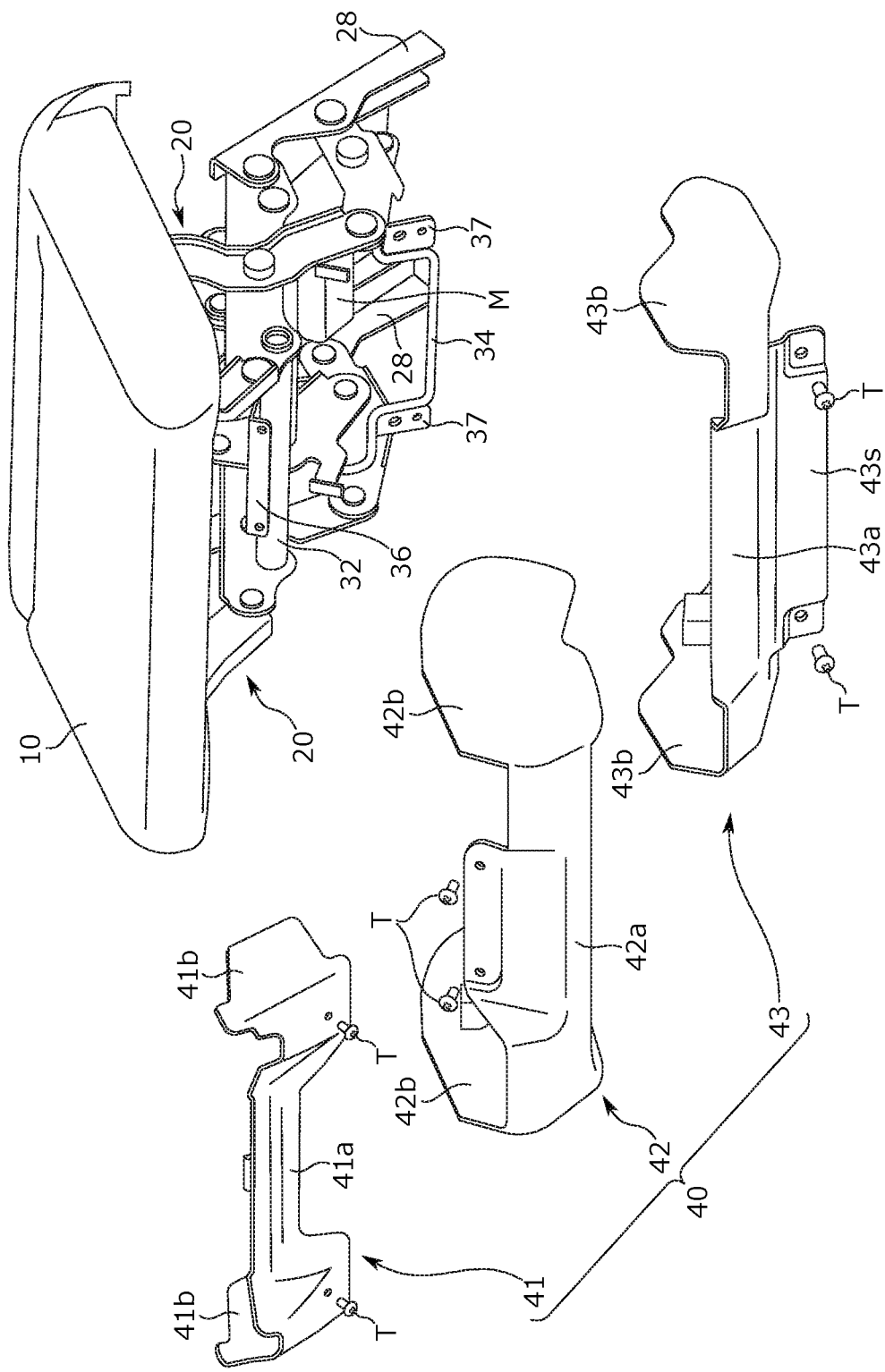
FIG. 4 is a view of the ottoman, the link groups, and a link cover.

Moreover, the vehicle seat S according to the present embodiment has a link cover 40 illustrated in FIG. 4. The link cover 40 is a resin cover member configured to cover the link groups 20 from the front and lateral sides. Note that in the present embodiment, the link cover 40 is divided into three pieces as illustrated in FIG. 4, and specifically, is divided into an upper cover 41, an intermediate cover 42, and a lower cover 43. Note that the link cover 40 is not limited to the link cover divided into multiple pieces as in the present embodiment, and may include a single piece.

Figure 5:
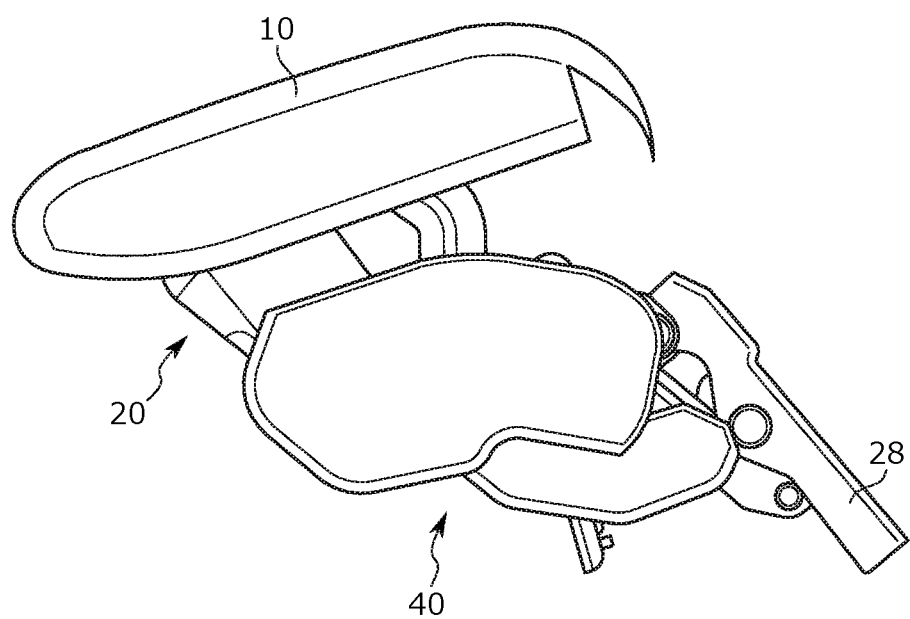
FIG. 5 is a side view of the link group and the link cover when the state of the ottoman is a use state.

The link cover 40 is deformable in association with switching of the state of the ottoman 10, i.e., operation of the link groups 20. Description will be made with reference to FIGS. 5 and 6. When the state of the ottoman 10 is in the use state, each link of the link group 20 is at one end position (an expansion position) in a movable area of such a link. In this state, the link cover 40 is in such a form (an expansion form) that the upper cover 41, the intermediate cover 42, and the lower cover 43 are arranged in the upper-to-lower direction as illustrated in FIG. 5.

Figure 6:
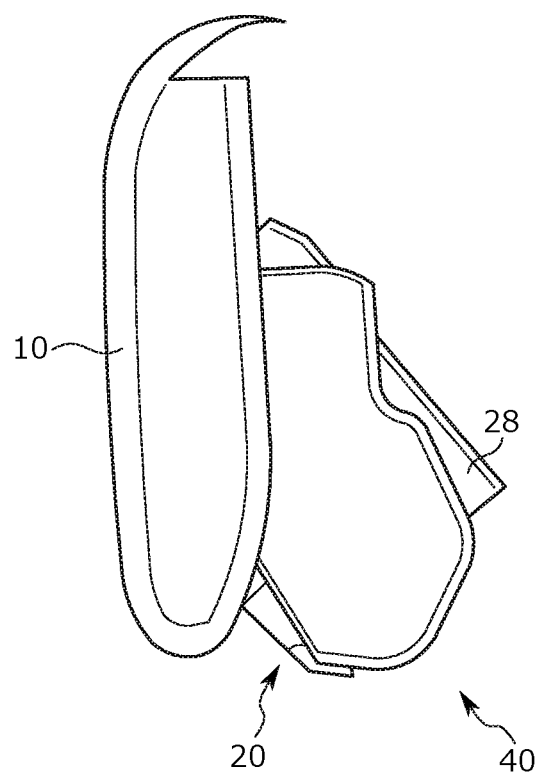
FIG. 6 is a side view of the link group and the link cover when the state of the ottoman is a housing state.

On the other hand, when the state of the ottoman 10 is at the housing position, each link of the link group 20 is at the other end position (a housing position) in the movable area of such a link. In this state, the link cover 40 is in such a form (a housing form) that the upper cover 41 and the lower cover 43 are inserted to the inside (the inside in the width direction) of the intermediate cover 42 as illustrated in FIG. 6.

As described above, in the present embodiment, the form of the link cover 40 is switchable in association with operation of the link groups 20. With this configuration, when the link groups 20 operate (in other words, when the state of ottoman 10 is switched), contact among the link groups 20 and the link cover 40 is avoided so that each link of the link group 20 can smoothly operate.

Hereinafter, a configuration of the link group 20 will be described in detail with reference to FIG. 3. Note that the link group 20 on one end side (the left side in FIG. 3) in the width direction and the link group 20 on the other end side (the right side in FIG. 3) in the width direction form a right-left symmetrical structure. Thus, only the configuration of the link group 20 on one end side in the width direction will be described below.

The link group 20 corresponds to an operation body of the present invention, and is equipment for moving the ottoman 10 between the use position and the housing position. Specifically, the link group 20 is movable together with the ottoman 10 with the link group 20 being attached to a lower portion of the ottoman 10. With this configuration, the ottoman 10 is movable between the use position and the housing position.

The link group 20 includes the multiple links (rotary links), and includes seven links in the present embodiment. More specifically, the multiple links forming the link group 20 include a single fixing target link fixed to the ottoman 10, four main body links forming a pantograph mechanism, and two sub-links. These seven links cooperate (perform moving operation) with each other, thereby switching the state of the ottoman 10.

Specifically, the link group 20 expands as illustrated in FIG. 3 or 4 upon use of the ottoman 10. On the other hand, upon housing of the ottoman 10, the link group 20 is folded such that the rotary links lie over one another. Note that any of the seven links forming the link group 20 is formed from a resin molded article.

Each link will be separately described. The link (hereinafter referred to as a "first link 21") corresponding to the above-described fixing target link is fixed to a substantially rectangular pan frame 11 forming a base portion (a bottom wall) of the ottoman 10 as illustrated in FIG. 3. The first link 21 is bolted to an end portion of the pan frame 11 in the width direction. When the ottoman 10 is in the use state (at the use position), an extension direction of the first link 21 and the front-to-back direction are parallel to each other.

Four links (hereinafter referred to as a "second link 22," a "third link 23," a "fourth link 24," and a "seventh link 27") corresponding to the above-described main body links form the pantograph mechanism as described above. Specifically, the third link 23 and the fourth link 24 correspond to two crosslinks crossing each other in a state allowing relative rotation. Note that the fourth link 24 corresponds to "one crosslink" of the present invention, and the third link 23 corresponds to "the other crosslink" of the present invention.

The third link 23 is a relatively-long link in a substantially Z-shape as viewed from the lateral side. When the ottoman 10 is in the use state (at the use position), the third link 23 extends downward from the pan frame 11 of the ottoman 10 at a position in the back of the second link 22 as illustrated in FIG. 3. Specifically, one end portion of the third link 23 in an extension direction thereof is, via a rivet R, rotatably assembled to an end portion of the first link 21 in the extension direction thereof (precisely, an end portion positioned backward when the state of the ottoman 10 is in the use state). When the ottoman 10 is in the use state (at the use position), the third link 23 is in such a posture that the extension direction thereof is slightly inclined with respect to the upper-to-lower direction, one end portion of the third link 23 on the side assembled to the first link 21 is at the uppermost position, and a portion closer to the other end of the third link 23 in the extension direction thereof is positioned lower.

The fourth link 24 is a substantially straight link as viewed from the lateral side. When the ottoman 10 is in the use state (at the use position), the fourth link 24 crosses the second link 22 and the third link 23 as illustrated in FIG. 3. Specifically, one end portion of the fourth link 24 in an extension direction thereof is, via a rivet R as a rotary shaft, rotatably assembled to an end portion of the second link 22 in an extension direction thereof (precisely, a portion positioned at a lower end portion of the ottoman 10 in the use state). Moreover, a center portion of the fourth link 24 in the extension direction thereof is, via a rivet R, rotatably assembled to a center portion of the third link 23 in the extension direction thereof. When the ottoman 10 is in the use state (at the use position), the fourth link 24 is in such a posture that the extension direction thereof is slightly inclined with respect to the front-to-back direction, and precisely, is in a posture inclined downward toward the back. That is, when the ottoman 10 is at the use position, one end portion, which is assembled to the second link 22, of the fourth link 24 in the extension direction thereof is at the foremost position, and a portion closer to the other end of the fourth link 24 in the extension direction thereof is positioned backward.

The second link 22 corresponds to a first opposing link, and is a link in a substantially lighting arrow shape as viewed from the lateral side. When the ottoman 10 is in the use state (at the use position), the second link 22 extends downward from the pan frame 11 of the ottoman 10 as illustrated in FIG. 3. Specifically, one end portion of the second link 22 in the extension direction thereof is, via a rivet R, rotatably assembled to an end portion of the first link 21 in the extension direction thereof (precisely, an end portion positioned forward when the state of the ottoman 10 is the use state). Moreover, the other end portion of the second link 22 in the extension direction thereof is, via the rivet R, rotatably assembled to the end portion of the fourth link 24 in the extension direction thereof (precisely, the end portion positioned forward when the state of the ottoman 10 is the use state). When the state of the ottoman 10 is the use state, the second link 22 faces the third link 23 in a posture substantially parallel to the third link 23, one end portion of the second link 22 on the side assembled to the first link 21 is at the uppermost position, and a portion closer to the other end of the second link 22 in the extension direction thereof is positioned lower.

The seventh link 27 corresponds to a second opposing link, and is a link in a substantially V-shape (precisely, a V-shape in which a bending angle is an obtuse angle) as viewed from the lateral side. When the ottoman 10 is in the use state (at the use position), the seventh link 27 is, below the fourth link 24, arranged next to the fourth link 24, and crosses the third link 23 as illustrated in FIG. 3. Specifically, one end portion of the seventh link 27 in an extension direction thereof is, via a rivet R, rotatably assembled to an end portion of the third link 23 in the extension direction thereof (precisely, an end portion positioned lower when the state of the ottoman 10 is the use state). Moreover, a middle portion of the seventh link 27 in the extension direction thereof is, via a rivet R as a rotary shaft, rotatably assembled to a predetermined portion of a sixth link 26 (precisely, a portion positioned lower than the fourth link 24 when the ottoman 10 is in the use state). When the state of the ottoman 10 is the use state (the use position), the seventh link 27 faces the fourth link 24 along the fourth link 24 at the position below the fourth link 24, and the end portion of the seventh link 27 on the side assembled to the third link 23 is at the foremost position. That is, one end portion, which is assembled to the third link 23, of the seventh link 27 in the extension direction thereof is at the foremost position, and a portion closer to the other end of the seventh link 27 in the extension direction thereof is positioned backward.

Two links (hereinafter referred to as a "fifth link 25" and the "sixth link 26") corresponding to the above-described sub-links are links configured to operate for moving the above-described four links (i.e., the second link 22, the third link 23, the fourth link 24, and the seventh link 27) forming the pantograph mechanism. Note that the sixth link 26 corresponds to a "first sub-link" of the present invention. Moreover, the fifth link 25 corresponds to an "auxiliary link" of the present invention, and also corresponds to a "second sub-link" of the present invention.

The fifth link 25 is a link in a substantially V-shape (precisely, a V-shape in which a bending angle is an obtuse angle) as viewed from the lateral side, and is a sub-link somewhat smaller than other links. The fifth link 25 is assembled to an end portion of the fourth link 24 in the extension direction thereof (precisely, the opposite end portion of the side assembled to the second link 22). More specifically, one end portion of the substantially V-shaped fifth link 25 is, via a rivet R as a rotary shaft, rotatably assembled to the end portion of the fourth link 24 in the extension direction thereof. The fifth link 25 itself operates (precisely, performs swing operation) to drag and move the fourth link 24.

The sixth link 26 is a link in a substantially V-shape (precisely, a V-shape in which a bending angle is an obtuse angle) as viewed from the lateral side, and is a sub-link. The sixth link 26 is assembled to the fifth link 25 with the sixth link 26 being adjacent to the fifth link 25 on the opposite side of the fourth link 24 in the width direction. More specifically, one end portion of the substantially V-shaped sixth link 26 is, via a rivet R, rotatably assembled to an end portion of the fifth link 25 (the opposite end portion of the side assembled to the fourth link 24). The sixth link 26 itself operates (precisely, performs swing operation) to drag and move the fifth link 25. In other words, the fifth link 25 swings together with the sixth link 26 when the sixth link 26 performs the swing operation.

Figure 10:
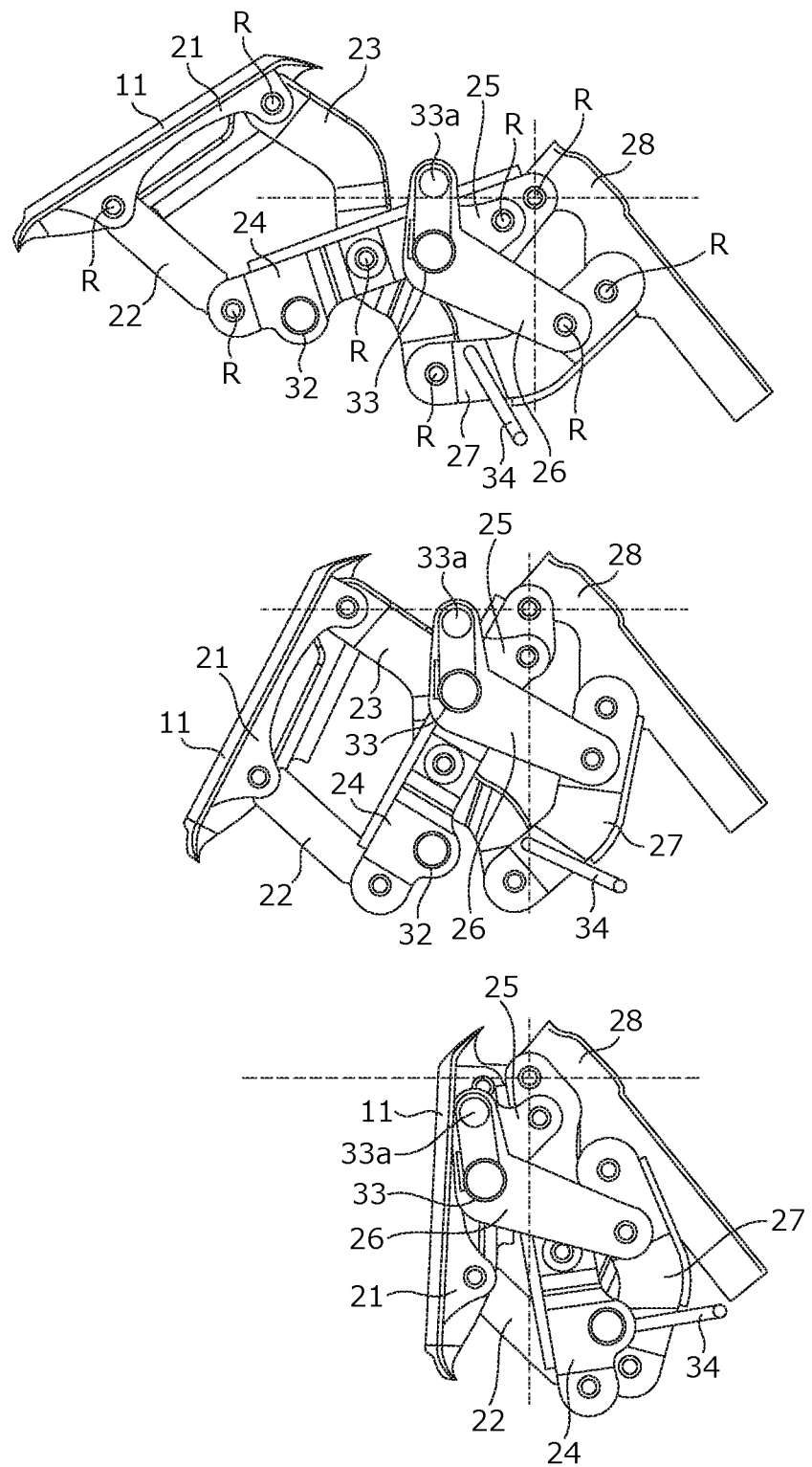
FIG. 10 is a view of an operation example of the link group, FIG. 10 illustrating a section along a B-B line of FIG. 7.

The end portion of the sixth link 26 on the opposite side of the side assembled to the fifth link 25 is, via the rivet R as the second rotary shaft, rotatably assembled to the middle portion of the seventh link 27 in the extension direction thereof as illustrated in FIG. 10, for example. The sixth link 26 itself operates (precisely, performs the swing operation) to drag and move the seventh link 27.

The link group 20 configured as described above expands from a folding state or folds from an expansion state in such a manner that each link performs moving operation (swing operation) within the movable area. With this configuration, the state of the ottoman 10 is switchable between the use state and the housing state.

Note that the rivet R used as a component for assembling the links together in the present embodiment is arranged such that an axial direction thereof is along the width direction. Moreover, the rivet R is assembled to each link in such a manner that the rivet R is inserted into a not-shown bush fitted in an insertion hole formed at each link and an end portion of the rivet R is swaged at the last stage.

The link group 20 is, via an attachment bracket 28 illustrated in FIG. 3, fixed to the seat cushion S1, precisely the not-shown seat cushion frame. The attachment bracket 28 will be described. The attachment bracket 28 includes a plate-shaped member extending in the upper-to-lower direction, and is provided at each of the right and left link groups 20 in a pair. That is, in the present embodiment, the attachment bracket 28 (a one-end-side attachment bracket) for attaching the link group 20 arranged on one end side in the width direction to the seat cushion S1 and the attachment bracket 28 (an other-end-side attachment bracket) for attaching the link group 20 arranged on the other end side in the width direction to the seat cushion S1 are provided.

The fourth link 24 and the seventh link 27 of the link group 20 are, via rivets R, rotatably attached to the attachment bracket 28. Specifically, a flange portion 28a bent to extend forward is, as illustrated in FIG. 3, formed at an outer end portion of the attachment bracket 28 in the width direction. Of link support portions provided at two upper and lower spots of the flange portion 28a, the upper link support portion rotatably supports, via the rivet R, an end portion of the fourth link 24 in the extension direction thereof (precisely, the opposite end portion of the side assembled to the second link 22). The lower link support portion rotatably supports, via the rivet R, an end portion of the seventh link 27 in the extension direction thereof (precisely, the opposite end portion of the side assembled to the third link 23).

As illustrated in FIG. 3, coupling members configured to couple the links of the link groups 20 to operate both link groups 20 in association with each other are provided between the right and left link groups 20 in a pair. Specifically, a first coupling member 31 including a rod material is arranged between the first links 21, a second coupling member 32 including a pipe material is arranged between the fourth links 24, a third coupling member 33 including a pipe material is arranged between the sixth links 26, and a fourth coupling member 34 including a rod material is arranged between the seventh links 27. Note that the third coupling member 33 corresponds to a "coupling member" of the present invention.

Note that the first coupling member 31, the second coupling member 32, and the fourth coupling member 34 are also used as components for holding the link cover 40. Specifically, the upper cover 41 is attached to the first coupling member 31, the intermediate cover 42 is attached to the second coupling member 32, and the lower cover 43 is attached to the fourth coupling member 34.

The link group 20 configured as described above expands from the folding state or folds from the expansion state by rotation of each link about the rivet R as the rotary shaft. Note that the rivet R is arranged such that the center axis thereof is along the width direction. Moreover, the rivet R is assembled to each link in such a manner that the rivet R is inserted into the not-shown bush fitted in the insertion hole formed at each link and the end portion of the rivet R is swaged at the last stage.

When the ottoman 10 is at the use position, i.e., the link group 20 expands, the rotary links (specifically, the second link 22, the third link 23, and the fourth link 24) positioned forward in the link group 20 are, below the ottoman 10, positioned forward with respect to the front end portion of the seat cushion S1. On the other hand, the rotary links (specifically, the fifth link 25, the sixth link 26, and the seventh link 27) positioned backward when the ottoman 10 is at the use position are positioned backward with respect to the front end of the seat cushion S1 and positioned inward in the width direction with respect to the side cover Fs of the seat cushion S1. That is, the rotary links positioned backward are covered with the side cover Fs from the lateral side.

Figure 7:
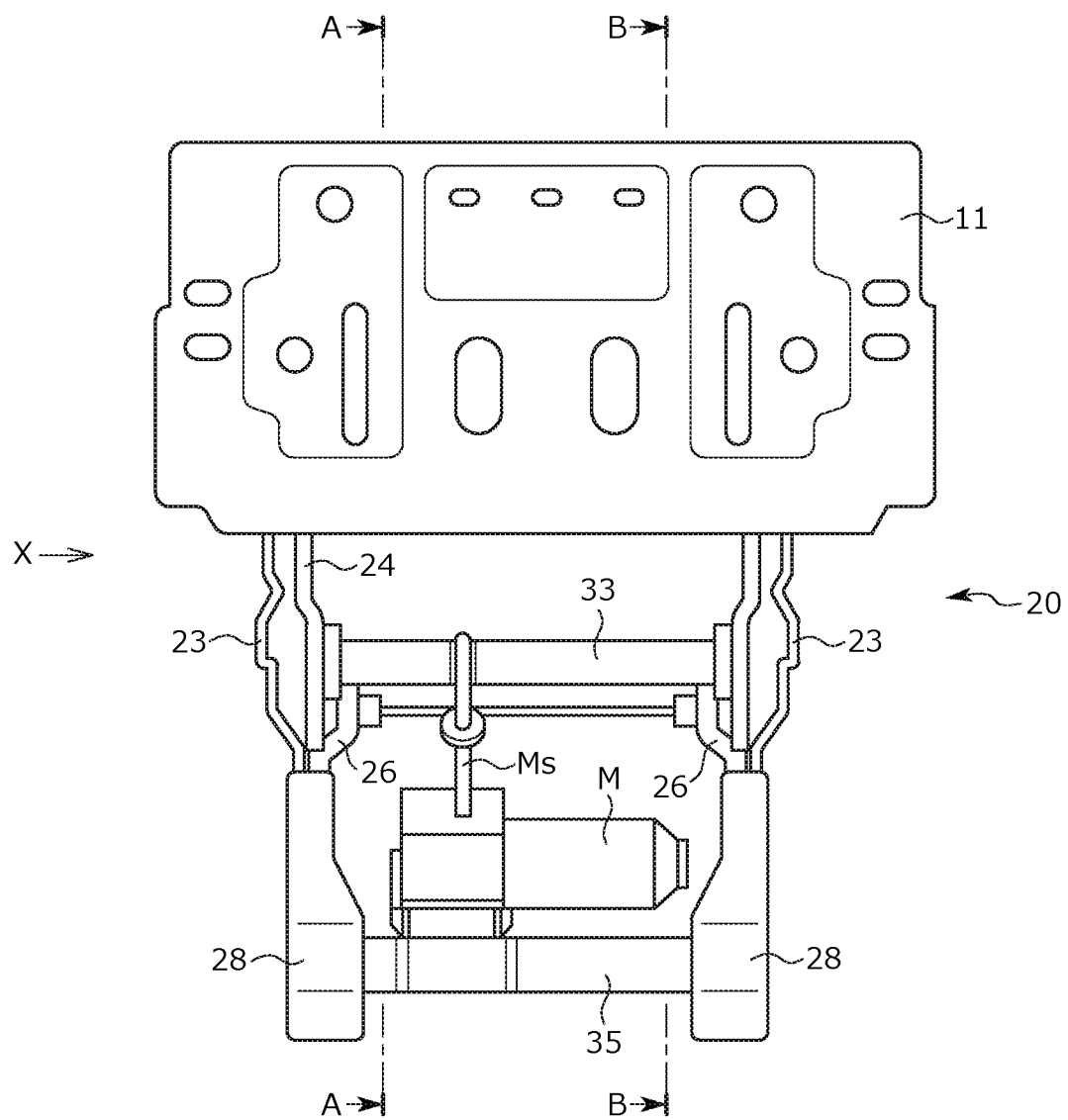
FIG. 7 is a view of the link groups from above.

The person seated on the vehicle seat S according to the present embodiment can automatically switch the state of the ottoman 10 by operating a not-shown switch. That is, a drive device configured to operate the pair of right and left link groups 20 is provided at the vehicle seat S according to the present embodiment. Such a drive device will be described. As illustrated in FIGS. 3 and 7, a motor M and an advancing/retreating member Ms form the drive device in the present embodiment. The advancing/retreating member Ms is a rod-shaped member, and is specifically a lead screw.

When the motor M is actuated (rotates), the advancing/retreating member Ms receives such rotation force to move straight. In this state, the direction of traveling the advancing/retreating member Ms is switched according to a rotation direction of the motor M, and therefore, the advancing/retreating member Ms moves straight while advancing/retreating.

A tip end portion of the advancing/retreating member Ms is attached to the third coupling member 33 via a tip end receiver 33a. The tip end receiver 33a functions as a drive force receiver configured to receive drive force of the advancing/retreating member Ms to transmit the drive force to each link group 20. More specifically, the tip end receiver 33a is a substantially plate-shaped component for holding the tip end portion of the advancing/retreating member Ms, and is fixed onto an outer peripheral surface of the third coupling member 33.

When the motor M rotates to advance/retreat the advancing/retreating member Ms, the tip end receiver 33a and the third coupling member 33 accordingly move, together with the tip end portion of the advancing/retreating member Ms, in a direction in which such a tip end portion directs. Thus, the sixth link 26 operates (performs the swing operation). Thereafter, the drive force from the advancing/retreating member Ms is sequentially transmitted to the remaining links via the sixth link 26. For example, when the sixth link 26 swings, the fifth link 25 and the sixth link 26 together swing, and therefore, the drive force from the advancing/retreating member Ms is transmitted to the fifth link 25.

Note that in the present embodiment, the advancing/retreating member Ms advances/retreats in a direction somewhat inclined with respect to the horizontal direction. Specifically, the advancing/retreating member Ms moves straight diagonally upward to the front upon advancing, and moves straight diagonally downward to the back upon retreating. Such movement of the advancing/retreating member Ms depends on a position relationship between the motor M and the tip end receiver 33a. Hereinafter, the position relationship between the motor M and the tip end receiver 33a will be described.

First, the arrangement position of the motor M will be described. As illustrated in FIG. 3, the motor M is, in the present embodiment, arranged between the right and left link groups 20 in a pair. More specifically, a horizontally-elongated motor fixing bracket 35 is provided to bridge between the attachment bracket 28 on one end side in the width direction and the attachment bracket 28 on the other end side in the width direction. The motor M is fixed to a front surface of the motor fixing bracket 35. According to such an arrangement position, the motor M is housed inside the pair of right and left link groups 20 in the width direction, and therefore, the mechanisms of the vehicle seat S around the ottoman 10 can be more downsized.

Next, the position of the tip end receiver 33a will be described. As described above, the tip end receiver 33a is fixed onto the outer peripheral surface of the third coupling member 33, and precisely, is fixed with the tip end receiver 33a extending upward from an upper portion of the outer peripheral surface. As illustrated in, e.g., FIG. 9, the third coupling member 33 is at the substantially same position as that of the motor M in the upper-to-lower direction. Thus, the tip end receiver 33a (specifically, a portion of the tip end receiver 33a fixed to the tip end of the advancing/retreating member Ms) is positioned upward with respect to the motor M.

More specifically, when the state of the ottoman 10 is the housing state as illustrated in, e.g., FIG. 9, the tip end receiver 33a is positioned slightly upward with respect to the motor M. On the other hand, when the state of the ottoman 10 is brought into the use state, the tip end receiver 33a is lifted as compared to an initial position (a position when the state of the ottoman 10 is the housing state), and is positioned somewhat upward with respect to the motor M.

The motor M and the tip end receiver 33a are in the above-described position relationship, and therefore, the advancing/retreating member Ms advances/retreats in the direction somewhat inclined with respect to the horizontal direction.

Note that in the present embodiment, the link group 20 is operated by means of the rotation force of the motor M, but the present invention is not limited to such a configuration. For example, it may be configured such that the above-described motor M is not provided and the seated person manually operates the link groups 20 to change the position of the ottoman 10.

Moreover, the link group 20 is not limited to the configuration of the present embodiment as long as the link group 20 moves the ottoman 10 between the use position and the housing position. For example, the link group 20 may include a smaller (or greater) number of links than that of the present embodiment.

Next, the flow of switching the state of the ottoman 10 will be, with reference to FIGS. 8 to 10, described mainly focusing on operation of the link groups 20 and the advancing/retreating member Ms. Note that each of FIGS. 8 to 10 illustrates states of three scenes different from each other in the state of the ottoman 10. Specifically, in each figure, an upper view is a view when the state of the ottoman 10 is the use state, a lower view is a view when the state of the ottoman 10 is the housing state, and a middle view is a view when the state of the ottoman 10 is a state in the middle of switching.

When the state of the ottoman 10 is the housing state, the advancing/retreating member Ms retreats most as illustrated in FIG. 9. Moreover, in such a state, the link group 20 is in the folding state. Specifically, as illustrated in FIGS. 8 and 10, the four main body links (i.e., the second link 22, the third link 23, the fourth link 24, and the seventh link 27) forming the pantograph mechanism are in a closed state.

In the above-described state, when the motor M is actuated (rotates), the advancing/retreating member Ms moves straight diagonally upward to the front. Accordingly, as illustrated in FIG. 9, the tip end receiver 33a and the third coupling member move, together with the tip end portion of the advancing/retreating member Ms, diagonally upward to the front. Moreover, the sixth link 26 swings to move diagonally upward to the front in association with movement of the third coupling member 33. In this state, the fifth link 25 swings together with the sixth link 26, and the fourth link 24 moves in association with swinging of the fifth link 25. Specifically, the fourth link 24 rotates such that the end portion (precisely, the end portion on the side assembled to the second link 22) in the extension direction is lifted about the rivet R assembled to the attachment bracket 28.

Meanwhile, when the sixth link 26 swings to move diagonally upward to the front, the sixth link 26 drags and moves the seventh link 27. Specifically, as illustrated in FIG. 10, the seventh link 27 rotates such that the end portion (precisely, the end portion on the side assembled to the third link 23) in the extension direction is lifted about the rivet R assembled to the attachment bracket 28.

Then, the third link 23 moves in association with rotary operation of both of the fourth link 24 and the seventh link 27. Specifically, the third link 23 rotates such that the end portion (precisely, the end portion on the side assembled to the first link 21) in the extension direction moves upward about the rivet R assembled to the seventh link 27. In this state, the second link 22 moves in association with rotary operation of the third link 23. Specifically, the second link 22 rotates such that the end portion (precisely, the end portion on the side assembled to the first link 21) in the extension direction moves upward about the rivet R assembled to the fourth link 24.

By a series of movement as described above, the state of the ottoman 10 is switched from the housing state to the use state. Moreover, by following the above-described flow in the opposite order, the state of the ottoman 10 is switched from the use state to the housing state. As described above, in the present embodiment, the drive force from the advancing/retreating member Ms is transmitted to each link of the link group 20, and accordingly, each link moves. As a result, the state of the ottoman 10 is switched.

As described in the "SOLUTION TO PROBLEM" section, rattling might occur between the tip end portion of the advancing/retreating member Ms and the tip end receiver 33a fixed to such a tip end portion. Specifically, in a case where the direction of moving the advancing/retreating member Ms straight is inclined with respect to the horizontal direction as in the present embodiment, the tip end portion of the advancing/retreating member Ms is easily swingable, and for this reason, rattling is more notable. In response to such a situation, a configuration for reducing the degree of rattling upon occurrence of rattling is employed in the present embodiment. Specifically, the link group 20 includes the above-described sub-links, and the degree of rattling is reduced by these sub-links.

Figure 11:
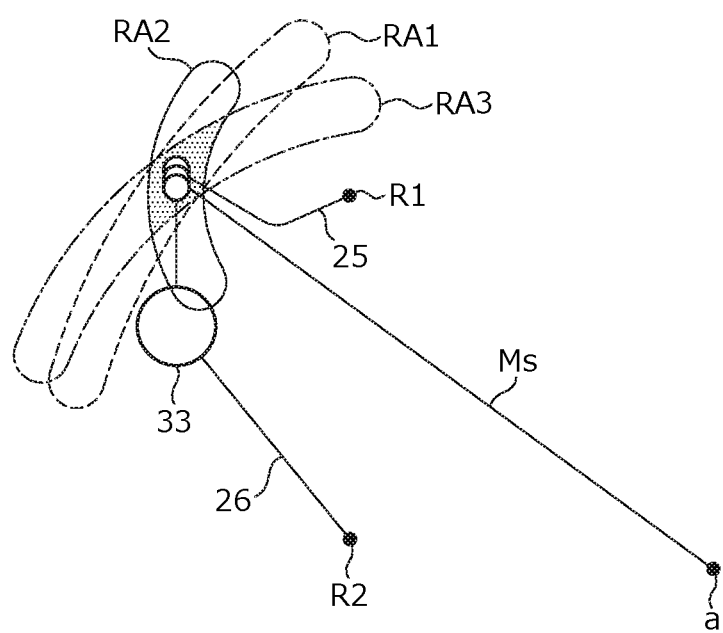
FIG. 11 is a view for describing a movable area of a tip end portion of an advancing/retreating member according to one embodiment of the present invention.

Hereinafter, the effect of reducing the degree of rattling by the sub-links will be described in detail with reference to FIGS. 11 and 12. Note that FIG. 11 is a view for describing a movable area of the tip end portion of the advancing/retreating member Ms according to the present embodiment, the view being a schematic view of frameworks and rotation trajectories of the sub-links and the advancing/retreating member Ms. Moreover, the movable area of the tip end portion of the advancing/retreating member Ms is illustrated as a hatched area in FIG. 11.

Figure 12:
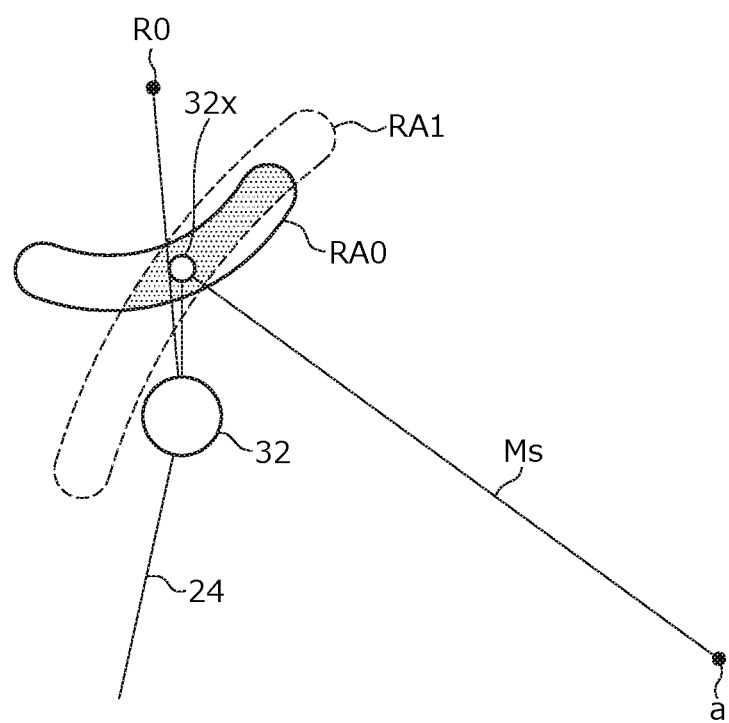
FIG. 12 is a view for describing a movable area of a tip end portion of an advancing/retreating member according to a comparative example.

FIG. 12 is a view for describing a movable area of a tip end portion of an advancing/retreating member Ms according to a comparative example. FIG. 12 illustrates a case where no sub-links are provided and drive force of the advancing/retreating member Ms is transmitted to main body links. Specifically, a case where a component (hereinafter referred to as another "tip end receiver 32x") similar to the tip end receiver 33a is provided at a second coupling member 32 coupling fourth links 24 together is illustrated. Moreover, FIG. 12 schematically illustrates frameworks and rotation trajectories of the fourth link 24 and the advancing/retreating member Ms, and the movable area of the tip end portion of the advancing/retreating member Ms is illustrated as a hatched area in FIG. 12.

Note that FIGS. 11 and 12 illustrate states when the state of the ottoman 10 is the housing state.

First, the degree of rattling in the comparative example will be described with reference to FIG. 12. Of the tip end portion of the advancing/retreating member Ms, a fixing portion fixed to the tip end receiver 32x is rotatable about the point (indicated by a character "a" in FIG. 12) of support in rotation. A rotation trajectory in this state will be referred to as a "first trajectory RA1."

Meanwhile, the fourth link 24 rotates about a rivet R (precisely, a rivet R assembled to an attachment bracket 28 and indicated by "R0" in FIG. 12) as a rotary shaft. Of the fourth link 24, a portion adjacent to the tip end portion (precisely, the fixing portion of the tip end portion fixed to the tip end receiver 32x) of the advancing/retreating member Ms in the width direction also rotates about the above-described rivet R, needless to say. A rotation trajectory in this state will be referred to as a "comparative trajectory RA0."

When the first trajectory RA1 and the comparative trajectory RA0 are projected onto a virtual plane (i.e., a virtual plane corresponding to the plane of paper of FIG. 12) perpendicular to the width direction, both trajectories are, although the trajectories are different from each other in a curving direction, parallel to each other, and overlap with each other across a relatively-broad area as illustrated in FIG. 12. Such an overlapping area of both trajectories corresponds to the movable area of the tip end portion of the advancing/retreating member Ms. Rattling of the tip end portion of the advancing/retreating member Ms might occur within the movable area of the tip end portion. For this reason, in a case where the movable area is relatively broad as in the case illustrated in FIG. 12, tendency shows that the degree of rattling is relatively high.

On the other hand, the two sub-links are, in the present embodiment, provided to narrow the above-described movable area specifically in the front-to-back direction. More specifically, in the present embodiment, the fixing portion of the tip end portion of the advancing/retreating member Ms fixed to the tip end receiver 33a is rotatable about the point (indicated by a character "a" in FIG. 11) of support in rotation. A rotation trajectory in this state will be, as in the comparative example, referred to as a "first trajectory RA1."

Of the two sub-links, the fifth link 25 positioned outside in the width direction is rotatable about the rivet R (precisely, the rivet R assembled to the fourth link 24 and indicated by "R1" in FIG. 11) as the rotary shaft. Of the fifth link 25, a portion at a position corresponding to the tip end portion of the advancing/retreating member Ms is, needless to say, rotatable about the above-described rivet R. A rotary trajectory in this state will be referred to as a "second trajectory RA2." Note that the portion of the fifth link 25 at the position corresponding to the tip end portion of the advancing/retreating member Ms is a portion of the tip end portion on the opposite side of the sixth link 26 from the fixing portion fixed to the tip end receiver 33a, and more specifically, is a portion at the same position as that of the above-described fixing portion in a circumferential direction of the third coupling member 33.

Of the two sub-links, the sixth link 26 positioned inward in the width direction is rotatable about the rivet R (precisely, the rivet R assembled to the seventh link 27 and indicated by "R2" in FIG. 11) as the second rotary shaft. In this state, a portion of the sixth link 26 adjacent to the tip end portion (precisely, the fixing portion of the tip end portion fixed to the tip end receiver 33a) of the advancing/retreating member Ms in the width direction is, needless to say, rotatable about the above-described rivet R. A rotation trajectory in this state will be referred to as a "third trajectory RA3."

When the first trajectory RA1, the second trajectory RA2, and the third trajectory RA3 are projected onto a virtual plane (i.e., a virtual plane corresponding to the plane of paper of FIG. 11) perpendicular to the width direction, the first trajectory RA1 and the third trajectory RA3 partially overlap with each other as illustrated in FIG. 11. Moreover, as illustrated in this figure, the second trajectory RA2 crosses (traverses) the area of the first trajectory RA1 overlapping with the third trajectory RA3. An area where three trajectories overlap with each other corresponds to the movable area of the tip end portion of the advancing/retreating member Ms.

As will be seen from comparison between FIG. 11 and FIG. 12, the movable area of the tip end portion of the advancing/retreating member Ms according to the present embodiment is, specifically in the front-to-back direction, narrowed as compared to the movable area of the comparative example. Thus, the degree of rattling (specifically, rattling in the front-to-back direction) which might occur at the tip end portion of the advancing/retreating member Ms is reduced.

Note that the degree of rattling in the front-to-back direction is reduced so that rattling of the tip end portion of the advancing/retreating member Ms in the front-to-back direction can be reduced when the state of the ottoman 10 is the housing state during vehicle travelling, for example.

The configuration of the conveyance seat (specifically, the vehicle seat S) of the present invention has been described above by way of example. Note that the above-described embodiment is for the sake of easy understanding of the present invention, and is not intended to limit the present invention. That is, changes or modifications can be made without departing from the gist of the present invention, and needless to say, the present invention includes equivalents thereof.

In the above-described embodiment, the rod-shaped lead screw is used as the advancing/retreating member Ms configured to move straight while advancing/retreating to move each link of the link group 20. Note that the present invention is not limited to such a configuration, and other members than the rod-shaped member may be employed as long as the drive force can be transmitted to each link by advancing/retreating in a straight movement direction.

Moreover, in the above-described embodiment, the motor M is used as a drive source of the advancing/retreating member Ms, but other devices than the motor M may be used as the drive source of the advancing/retreating member Ms as long as the advancing/retreating member Ms can be driven.

Further, in the above-described embodiment, the link group 20 includes the seven links, but the number of links forming the link group 20 can be set as necessary. In addition, in the above-described embodiment, the link group 20 includes the two sub-links (i.e., the fifth link 25 and the sixth link 26). With these two sub-links, the movable area of the tip end portion of the advancing/retreating member Ms is narrowed, and in this manner, the degree of rattling at the tip end portion is reduced. Note that the number of sub-links provided to narrow the movable area of the tip end portion of the advancing/retreating member Ms can be set as necessary.

Moreover, in the above-described embodiment, the link group 20, the advancing/retreating member Ms, and the motor M are used as a mechanism for switching the state of the ottoman 10. That is, in the above-described embodiment, the configuration of switching the state of the ottoman 10 by operation of each link of the link group 20 will be described as an application example of the present invention. Note that the present invention is applicable to a conveyance seat capable of switching a seat main body state by multiple links, and needless to say, is also applicable to the configuration of switching a portion of a seat main body other than an ottoman 10. For example, the present invention is also applicable to a conveyance seat having a mechanism (i.e., a height link mechanism) configured to move the position of a seat main body (specifically, a seat cushion) in the upper-to-lower direction by operation of multiple links.

Next, the link cover 40 will be described. For describing the link cover 40, a typical link cover (specifically, a link cover described in JP2013-252257A) will be described. The typical link cover is formed from, e.g., a carpet, and is provided to reduce adherence of a foreign substance etc. to a link mechanism. Moreover, the link cover is normally arranged at the periphery of the link mechanism, such as a position in the front of the link mechanism.

When the link cover is attached, the cover needs to be attached not to interfere with operation of the link mechanism. Preferably, the process of attaching the cover is easily performed, needless to say. Note that in the typical case, a J-hook is attached to the link cover, and for attachment of the cover, is hooked on a frame provided at a lower portion of an ottoman, for example. A configuration allowing attachment of the cover in a simpler manner than such a configuration has been demanded. That is, in a configuration in which an operation body configured to operate to move the ottoman is covered with the cover, proper and easy attachment of the cover is taken as a challenge.

According to the vehicle seat of the present embodiment, the above-described challenge can be solved by a vehicle seat including an ottoman configured to support the lower thighs of a seated person in the front of a seat cushion, an operation body (specifically, a link group 20; the same shall apply hereinafter) configured to move together with the ottoman with the operation body being attached to the ottoman for moving the ottoman between a use position as a position when the ottoman supports the lower thighs and a housing position as a position when the ottoman is retracted from the use position toward a front end portion of the seat cushion, and a cover having, at a surface facing a protruding portion protruding from a side surface of the operation body, an engagement portion engaging with the protruding portion and configured to cover the operation body with the engagement portion engaging with the protruding portion.

In the vehicle seat configured as described above, the protruding portion protruding from the side surface of the operation body engages with the engagement portion provided on the surface of the cover facing the protruding portion, and in this manner, the cover is attached. With such a configuration, the cover is attached by engagement of the protruding portion with the engagement portion so that the process of attaching the cover can be easily performed. Moreover, the above-described protruding portion is provided on the side surface of the operation body so that engagement (in other words, attachment of the cover) between the protruding portion and the engagement portion can be performed at a position not contacting the operation body. As described above, according to the vehicle seat of the present invention, the cover can be properly and easily attached.

Moreover, in the present embodiment, the engagement portion is an insertion hole formation portion forming an insertion hole into which the protruding portion is to be inserted. In such a configuration, the protruding portion is inserted into the insertion hole upon attachment of the cover. With such a configuration, the process of attaching the cover can be more facilitated.

Further, in the present embodiment, an opening is formed at a surface of the insertion hole formation portion positioned at a back end surface when the ottoman is at the use position. In such a configuration, when the protruding portion is inserted into the insertion hole, the insertion hole can be easily expanded due to the opening, and therefore, the protruding portion can be smoothly inserted into the insertion hole. With this configuration, the process of attaching the cover can be further facilitated.

In addition, in the present embodiment, the cover has a front wall portion configured to cover the operation body from the front thereof, and the front wall portion is positioned forward with respect to the operation body when the ottoman is at the use position. In such a configuration, the front wall of the cover is arranged at the position in the front of the operation body when the ottoman is at the use position, and therefore, adherence of a foreign substance to the operation body upon use of the ottoman can be effectively reduced.

Moreover, in the present embodiment, the operation body has a rotary shaft along the width direction of the vehicle seat, and a rotary link rotatable about the rotary shaft. The protruding portion is provided outward with respect to the rotary link in the width direction. In such a configuration, the protruding portion is provided outward with respect to the rotary link in the width direction of the vehicle seat, and therefore, engagement (in other words, attachment of the cover) between the protruding portion and the engagement portion can be performed at a position not contacting the rotary link. That is, the above-described configuration allows attachment of the cover without interfering with rotary operation of the rotary link.

Further, in the present embodiment, the cover has a side wall portion configured to cover the operation body from the lateral side thereof, the side wall portion is positioned outward with respect to the protruding portion in the width direction of the vehicle seat, and the surface of the cover facing the protruding portion is a surface of the side wall portion facing inward in the width direction. In such a configuration, the side wall portion of the cover is positioned outward with respect to the protruding portion in the width direction of the vehicle seat, and the engagement portion is provided at the surface of the side wall portion facing inward in the width direction. With such a configuration, the inside of a space positioned inward in the width direction with respect to the side wall portion of the cover is effectively utilized so that engagement of the protruding portion with the engagement portion can be performed.

In addition, in the present embodiment, the vehicle seat further includes a motor configured to rotate to operate the operation body, and the cover covers both of the operation body and the motor. In such a configuration, the cover for covering the operation body is also used as the cover for covering the motor. With such a configuration, the number of components can be reduced as compared to the case of separately providing covers for the operation body and the motor.

Moreover, in the present embodiment, the operation body has a rotary shaft along the width direction of the vehicle seat, and multiple rotary links rotatable about the rotary shaft with the rotary links being coupled together via the rotary shaft. The protruding portion is provided at a portion of the rotary shaft positioned outward in the width direction with respect to those, which are positioned outward in the width direction, of the multiple rotary links. Of the rotary shaft coupling the rotary links together, the portion positioned outward with respect to the outer rotary links is provided with the protruding portion in this configuration. With such a configuration, the protruding portion can be provided integrally with the rotary shaft, and therefore, the number of components can be reduced as compared to the case of separately providing the rotary shaft and the protruding portion.

As described above, according to the vehicle seat of the present embodiment, the cover configured to cover the operation body configured to operate to move the ottoman can be properly and easily attached.

Moreover, in the present embodiment, it is configured such that the protruding portion is inserted into the insertion hole upon attachment of the cover, and therefore, the process of attaching the cover is more facilitated.

Further, in the present embodiment, the protruding portion can be smoothly inserted into the insertion hole, and therefore, the process of attaching the cover is further facilitated.

In addition, in the present embodiment, the front wall of the cover is arranged at the position in the front of the operation body when the ottoman is at the use position, and therefore, adherence of a foreign substance to the operation body upon use of the ottoman can be effectively reduced.

Moreover, in the present embodiment, engagement between the protruding portion and the engagement portion is performed at the position not contacting the rotary link, and therefore, the cover can be attached not to interfere with the rotary operation of the rotary link.

Further, in the present embodiment, the inside of the space positioned inward in the width direction with respect to the side wall portion of the cover is effectively utilized, and therefore, engagement of the protruding portion with the engagement portion can be performed.

In addition, in the present embodiment, the cover for covering the operation body is also used as the cover for covering the motor, and therefore, the number of components can be more reduced.

Moreover, in the present embodiment, the protruding portion is provided integrally with the rotary shaft, and therefore, the number of components can be more reduced.

Hereinafter, a configuration of the link cover 40 of the present embodiment will be described with reference to FIGS. 13 to 19. Note that unless otherwise provided, the position, posture, etc. of each portion of the link cover 40 as described below are in accordance with the contents when the ottoman 10 is at the use position.

The link cover 40 corresponds to a cover of the present invention, and is attached to reduce adherence of a foreign substance to the link group 20. The link cover 40 includes a resin cover, and is configured to cover the link group 20 from the front and lateral sides.

The configuration of the link cover 40 according to the present embodiment will be described. As illustrated in FIG. 4, the link cover 40 is divided into three pieces, and specifically, is divided into the upper cover 41, the intermediate cover 42, and the lower cover 43. Note that the link cover 40 is not limited to the link cover divided into multiple pieces as in the present embodiment, and may include a single piece.

Each piece of the link cover 40 will be described. The upper cover 41 mainly covers the rotary link positioned on the upper side, specifically the second link 22. The intermediate cover 42 mainly covers the rotary links at a middle position of the link group 20 in the upper-to-lower direction, specifically the third link 23, the fourth link 24, and the fifth link 25. The lower cover 43 mainly covers the rotary links positioned on the lower side, specifically the sixth link 26 and the seventh link 27.

As illustrated in FIG. 4, each piece is formed in a substantially U-shape, and includes a front wall portion 41a, 42a, 43a and side wall portions 41b, 42b, 43b. The front wall portion 41a, 42a, 43a is a portion positioned in the front of the corresponding rotary link(s) (the rotary link(s) covered with each piece) to cover the rotary link(s) from the front when the ottoman 10 is at the use position. Note that in the present embodiment, the front wall portion 41a, 42a, 43a covers the corresponding rotary link (s) in a state in which the front wall portion 41a, 42a, 43a is slightly inclined (inclined forward) with respect to the upper-to-lower direction when the ottoman 10 is at the use position. Moreover, the horizontal width of the front wall portion 41a, 42a, 43a have a sufficient length to simultaneously cover the rotary links of both of the left link group 20 and the right link group 20.

The side wall portions 41b, 42b, 43b are each positioned on both sides of a corresponding one of the front wall portions 41a, 42a, 43a, and extend in a direction crossing a corresponding one of the front wall portions 41a, 42a, 43a. When the ottoman 10 is at the use position, the side wall portions 41b, 42b, 43b are positioned outward in the width direction with respect to the corresponding rotary link(s) to cover the rotary link(s) from the lateral side.

In the present embodiment, the lower cover 43 includes, at a lower end portion thereof, a lower extending portion 43s extending downward as illustrated in FIG. 4. The lower extending portion 43s is, when the ottoman 10 is at the use position, positioned in the front of the above-described motor M to cover the motor M from the front. Thus, the link cover 40 according to the present embodiment has the function of covering the link group 20, as well as having the function of covering the motor M. With the configuration of covering both of the link group 20 and the motor M with the link cover 40, the number of components can be reduced as compared to the configuration of separately providing covers for the link group 20 and the motor M.

Moreover, each piece forming the link cover 40 is attached to move in association with the rotary link(s) of the link group 20. In other words, the upper cover 41, the intermediate cover 42, and the lower cover 43 are attached not to interfere with the rotary operation of each rotary link. When the rotary links of the link group 20 integrally perform the rotary operation, each piece of the link cover 40 operates accordingly. More specifically, when the ottoman 10 is at the housing position (i.e., when the link group folds), the link cover 40 is in a state in which the pieces lie over one another, i.e., in the folding state. On the other hand, when the ottoman 10 is at the use position (i.e., when the link group 20 expands), the link cover 40 is in a state in which the pieces somewhat shift from each other in the upper-to-lower direction, i.e., the expansion state.

In the present embodiment, attachment of the link cover 40 is performed such that the link cover 40 expands or folds without interfering with operation of the link group 20 as described above. Hereinafter, a mechanism for attaching the link cover 40 in the present embodiment will be described.

Figure 13:
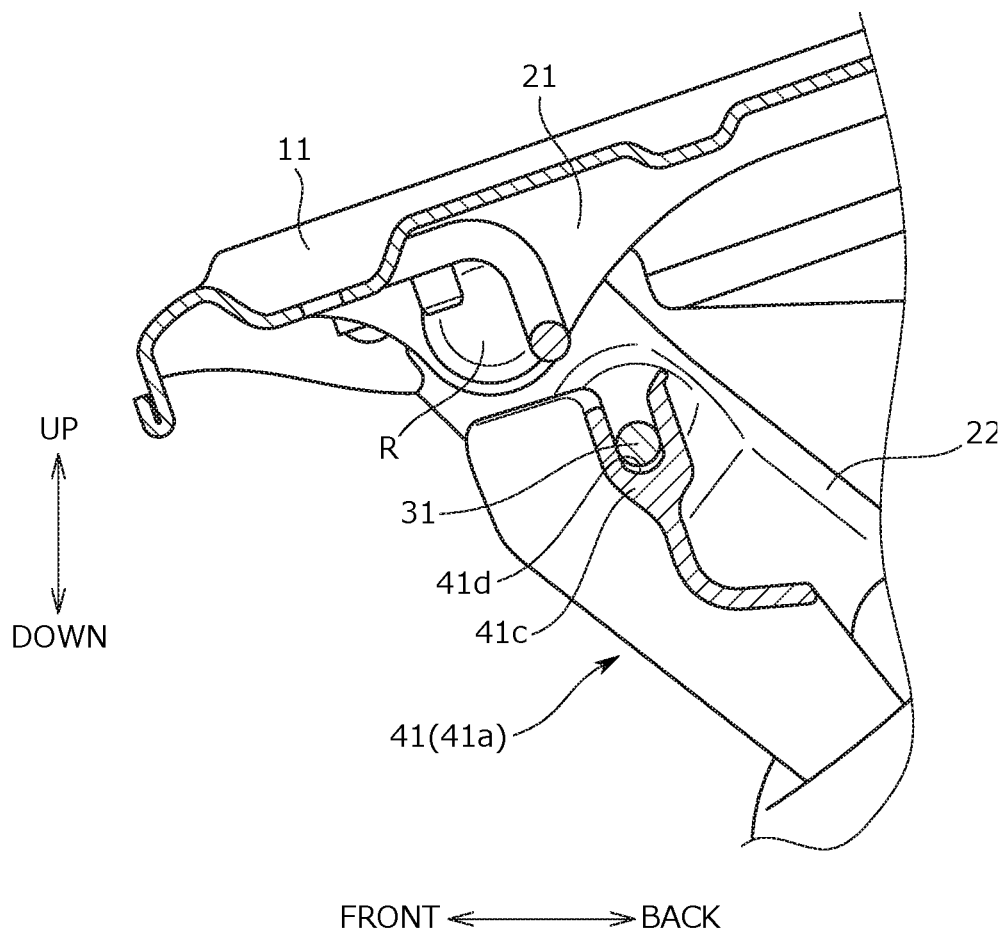
FIG. 13 is an enlarged sectional view of an attachment portion of an upper cover as a component of a cover.

First, a mechanism for attaching the upper cover 41 will be described. As illustrated in FIG. 13, a substantially U-shaped locking groove formation portion 41c is provided at an upper end portion of the front wall portion 41a of the upper cover 41. The locking groove formation portion 41c forms a locking groove 41d, and extends elongated along the width direction. Moreover, the locking groove 41d is formed elongated along the width direction, and the width of the locking groove 41d is slightly smaller than the outer diameter of the first coupling member 31 of the rod material arranged between the first links 21.

As illustrated in FIG. 13, the first coupling member 31 is fitted in the locking groove 41d. More specifically, the upper cover 41 is set such that the entire opening area of the locking groove 41d faces an outer peripheral surface of the first coupling member 31, and thereafter, the first coupling member 31 is fitted in such a groove through the opening of the locking groove 41d. At this point, the first coupling member 31 is fitted in the locking groove 41d while expanding the width of the locking groove 41d. Eventually, the first coupling member 31 engages with the locking groove 41d with the first coupling member 31 being sandwiched between portions of the locking groove formation portion 41c positioned on both sides of the locking groove 41d. When reaching such a state, the upper cover 41 is attached to the first coupling member 31.

In the present embodiment, the upper cover 41 is, via tapping screws T, fixed to a front end portion (precisely, a portion positioned at the front end portion of the ottoman 10 at the use position) of the second link 22. More specifically, the front end portion of the second link 22 bends outward in the width direction at a substantially right angle, thereby forming a flange as illustrated in FIG. 3. The front wall portion 41a of the upper cover 41 is, via the tapping screws T, fastened to such a flange portion. With such a configuration, the front wall portion 41a of the upper cover 41 is, when the ottoman 10 is at the use position, positioned forward with respect to the front end portion of the second link 22, thereby covering the second link 22 from the front.

Figure 14:
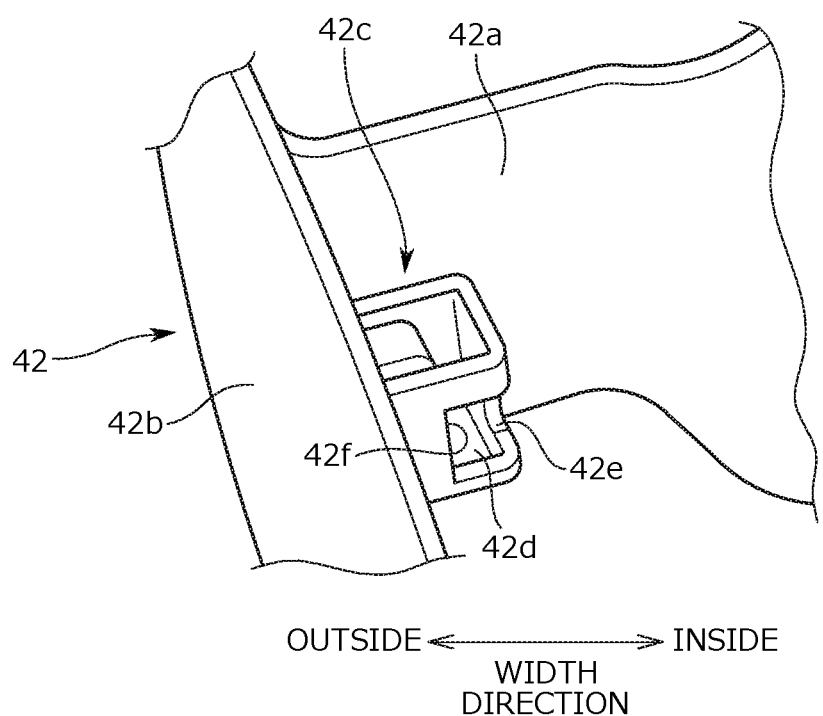
FIG. 14 is an enlarged view of an engagement portion.

Next, a mechanism for attaching the intermediate cover 42 will be described. As illustrated in FIG. 14, an insertion hole formation portion 42c as an engagement portion is formed at an inner surface of each side wall portion 42b of the intermediate cover 42 in the width direction (FIG. 14 illustrates only the side wall portion 42b on one end side in the width direction). The insertion hole formation portion 42c is a protrusion formed integrally with an intermediate cover main body (other portions of the intermediate cover 42 than the insertion hole formation portion 42c) upon shaping of the intermediate cover 42. Moreover, the insertion hole formation portion 42c forms an insertion hole 42d therein. Further, a through-hole 42e illustrated in FIG. 14 is formed at a portion of the insertion hole formation portion 42c adjacent to the insertion hole 42d on the inside in the width direction. Further, as illustrated in this figure, an opening 42f communicating with the insertion hole 42d is formed at a portion of the insertion hole formation portion 42c different from the portion provided with the through-hole 42e. The portion provided with the opening 42f defines a surface positioned at a back end surface of the insertion hole formation portion 42c when the ottoman 10 is at the use position.

Figure 15:
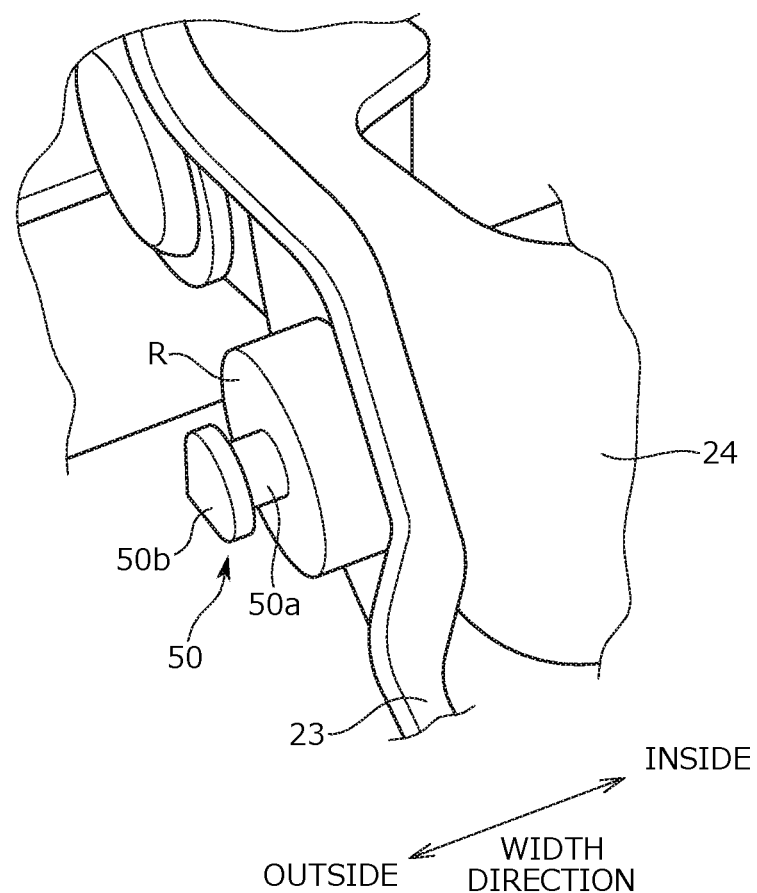
FIG. 15 is an enlarged view of a protruding portion.

Meanwhile, a protruding portion 50 to be engaged with the above-described insertion hole 42d is provided at each link group 20. As illustrated in FIG. 15, the protruding portion 50 is provided at the rivet R forming the rotary shaft upon rotation of the rotary links, specifically the rivet R (hereinafter referred to as a "specified rivet R") coupling the third link 23 and the fourth link 24. The specified rivet R will be described. As illustrated in FIG. 3, a top portion of the specified rivet R is thicker than top portions of other rivets R. The top portion of the specified rivet R as described herein is an end portion on the outside in the width direction. More precisely, the top portion of the specified rivet R is an end portion positioned outward in the width direction with respect to one (specifically, the third link 23), which is positioned outward in the width direction, of the two rotary links coupled via the specified rivet R.

As illustrated in FIG. 15, the above-described protruding portion 50 protrudes from a side surface (an outer end surface in the width direction) of the top portion of the specified rivet R. The protruding portion 50 will be described. The protruding portion 50 includes a base portion 50a extending outward in the width direction, and a horizontal spinning top-shaped tip end portion 50b. The outer diameter of the tip end portion 50b is greater than the outer diameter of the base portion 50a. Moreover, the outer diameter of the base portion 50a is slightly smaller than the diameter of the through-hole 42e provided at the insertion hole formation portion 42c. Further, the size of the tip end portion 50b is such a size that the entirety of the tip end portion 50b can be housed in the insertion hole 42d.

Note that in the present embodiment, the protruding portion 50 is formed integrally with the specified rivet R. That is, in the present embodiment, the protruding portion 50 is provided integrally with the specified rivet R, and the number of components is, by such a configuration, reduced as compared to the case of separately providing the specified rivet R and the protruding portion 50.

The protruding portion 50 configured as described above is positioned inward in the width direction with respect to the side wall portion 42b of the intermediate cover 42 in a state in which the intermediate cover 42 is set at the arrangement position thereof. Further, when the intermediate cover 42 is set, the protruding portion 50 faces the insertion hole formation portion 42c provided at the inner surface of the side wall portion 42b of the intermediate cover 42 in the width direction. In other words, the side wall portion 42b of the intermediate cover 42 is positioned outward with respect to the protruding portion 50 in the width direction, and the inner surface (the surface facing inward in the width direction) of the side wall portion 42b is a surface facing the protruding portion 50.

Figure 16:
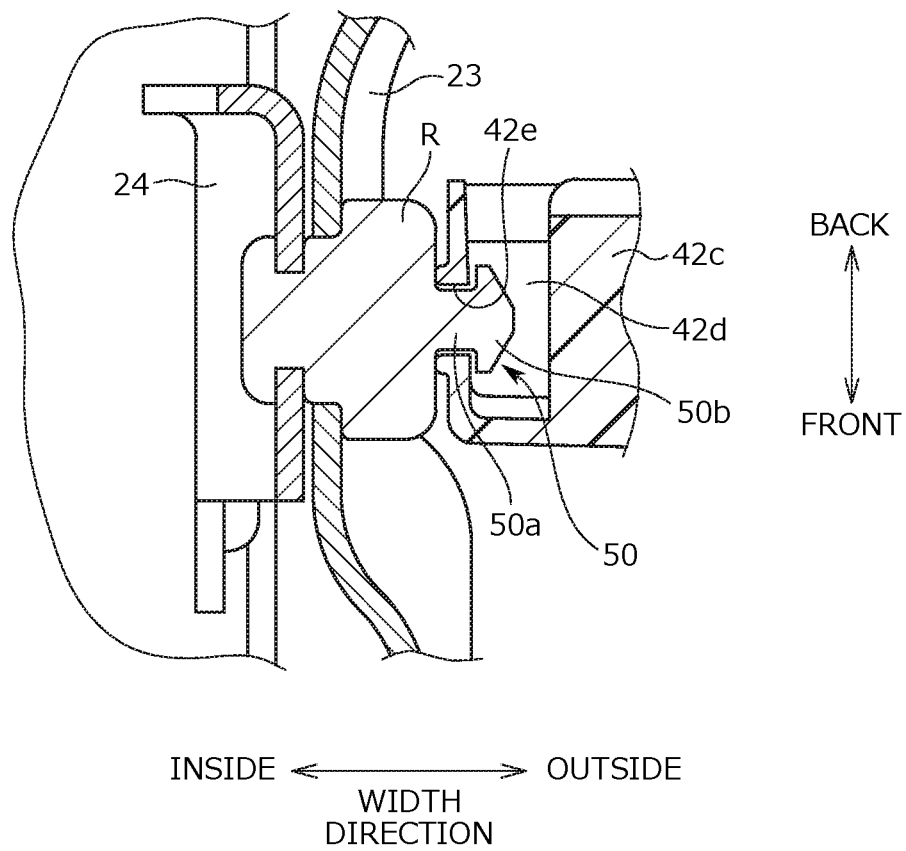
FIG. 16 is a view of a state when the protruding portion illustrated in FIG. 15 engages with the engagement portion illustrated in FIG. 14.

Then, the protruding portion 50 is inserted into the insertion hole 42d as illustrated in FIG. 16. More specifically, the intermediate cover 42 is set such that the tip end portion 50b of the protruding portion 50 faces the through-hole 42e formed at an inner portion of the insertion hole formation portion 42c in the width direction. Thereafter, the protruding portion 50 is inserted into the insertion hole 42d through the through-hole 42e. At this point, the protruding portion 50 is inserted into the insertion hole 42d while expanding the through-hole 42e by the tip end portion 50b. That is, the insertion hole formation portion 42c elastically deforms such that the through-hole 42e is expanded by pressing of the tip end portion 50b of the protruding portion 50 against a peripheral portion of the through-hole 42e.

Note that in the present embodiment, the opening 42f illustrated in FIG. 14 is formed at the back end surface (precisely, the surface positioned at the back end surface of the ottoman 10 at the use position) of the insertion hole formation portion 42c. With this opening 42f, the insertion hole 42d can be, in the present embodiment, easily expanded when the protruding portion 50 is inserted into the insertion hole 42d. As a result, the protruding portion 50 is smoothly inserted into the insertion hole 42d.

Eventually, the protruding portion 50 engages with the insertion hole 42d at the time of inserting the protruding portion 50 until the entirety of the tip end portion 50b is housed in the insertion hole 42d. Precisely, the tip end portion 50b of the protruding portion 50 is locked at an edge portion of the insertion hole 42d of the insertion hole formation portion 42c. When reaching such a state, the intermediate cover 42 is attached to the protruding portion 50 provided at the specified rivet R.

As described above, in the present embodiment, the protruding portion 50 protruding from the side surface (the outer end surface of the top portion in the width direction) of the specified rivet R is inserted into the insertion hole 42*d* provided at the inner surface of the side wall portion 42*b* of the intermediate cover 42 in the width direction, and in this manner, the intermediate cover 42 is attached. With such a configuration, the process of attaching the intermediate cover 42 is facilitated. Moreover, the protruding portion 50 is provided outward in the width direction with respect to one (specifically, the third link 23), which is on the outside in the width direction, of the rotary links coupled via the specified rivet R. Thus, insertion of the protruding portion 50 into the insertion hole 42*d* (in other words, attachment of the intermediate cover 42) can be performed at the position not contacting the above-described rotary links. As a result, the intermediate cover 42 is properly attached not to interfere with the rotary operation of the above-described rotary links.

Attachment of the intermediate cover 42 will be described in more detail. In the present embodiment, the front wall portion 42*a* of the intermediate cover 42 is attached to the second coupling member 32 via an intermediate cover fixing bracket 36 illustrated in FIGS. 3 and 4. The intermediate cover fixing bracket 36 is welded to a front end portion (precisely, a portion positioned at the front end portion of the ottoman 10 at the use position) of the second coupling member 32. Moreover, an upper end portion of the front wall portion 42*a* of the intermediate cover 42 is, via tapping screws T, fastened to a front surface of the intermediate cover fixing bracket 36. With such a configuration, the front wall portion 42*a* of the intermediate cover 42 is, when the ottoman 10 is at the use position, positioned forward with respect to the rotary links (specifically, the third link 23, the fourth link 24, and the fifth link 25) covered with the intermediate cover 42, thereby covering the rotary links from the front.

Figure 17:
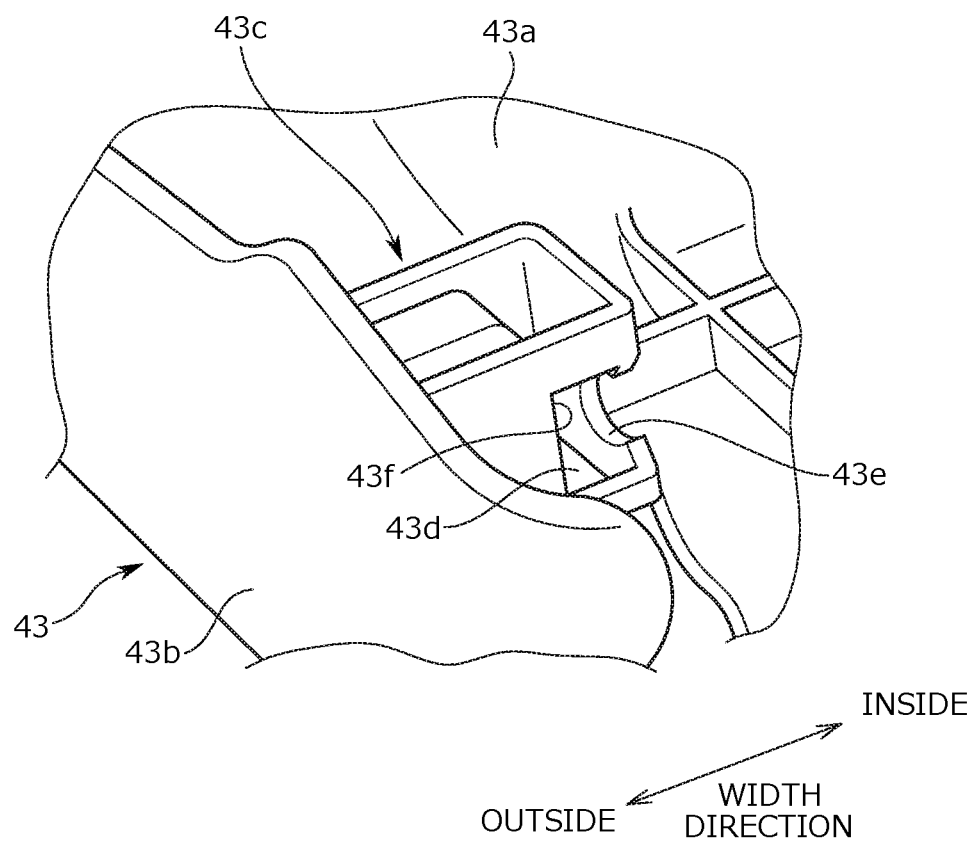
FIG. 17 is an enlarged view of an engagement portion.

Next, a mechanism for attaching the lower cover 43 will be described. As illustrated in FIG. 17, an insertion hole formation portion 43*c* as an engagement portion is formed at an inner surface of each side wall portion 43*b* of the lower cover 43 in the width direction (FIG. 17 illustrates only the side wall portion 43*b* on one end side in the width direction). The insertion hole formation portion 43*c* is a protrusion formed integrally with a lower cover main body (other portions of the lower cover 43 than the insertion hole formation portion 43*c*) upon shaping of the lower cover 43. Note that the insertion hole formation portion 43*c* provided at the side wall portion 43*b* of the lower cover 43 has a configuration similar to that of the insertion hole formation portion 42*c* provided at the side wall portion 42*b* of the intermediate cover 42. That is, the insertion hole formation portion 43*c* provided at the side wall portion 43*b* of the lower cover 43 forms an insertion hole 43*d* therein. Moreover, a through-hole 43*e* illustrated in FIG. 17 is formed at a portion of the insertion hole formation portion 43*c* adjacent to the insertion hole 43*d* on the inside in the width direction. Further, an opening 43*f* illustrated in FIG. 17 is formed at a back end surface (a surface positioned at the back end surface of the ottoman 10 at the use position) of the insertion hole formation portion 43*c*.

Figure 18:
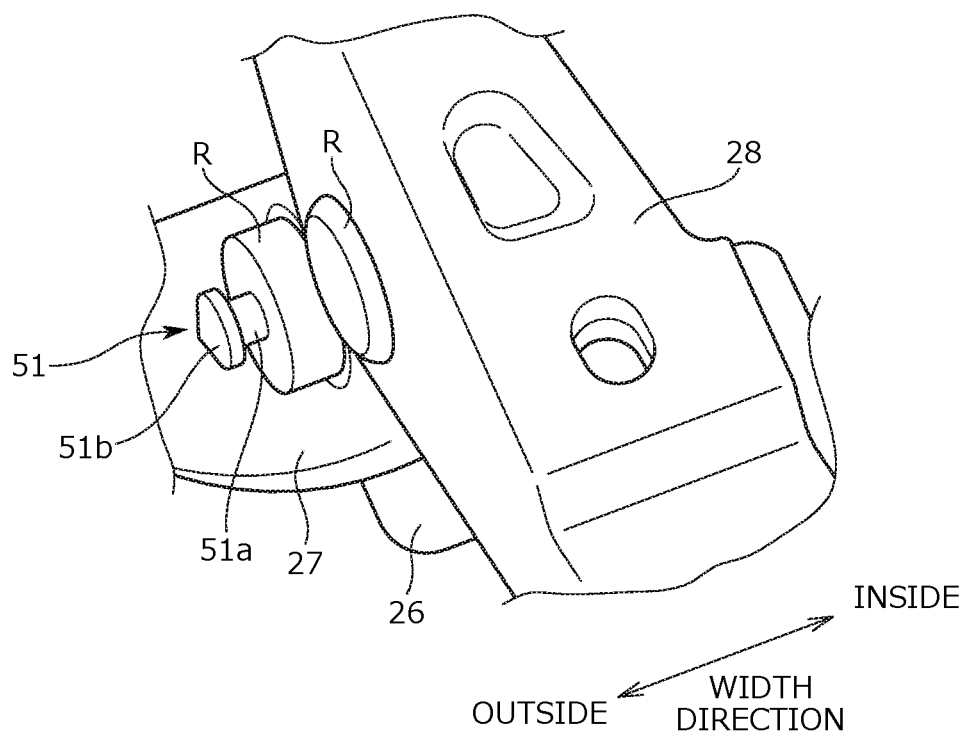
FIG. 18 is an enlarged view of a protruding portion.
Figure 19:
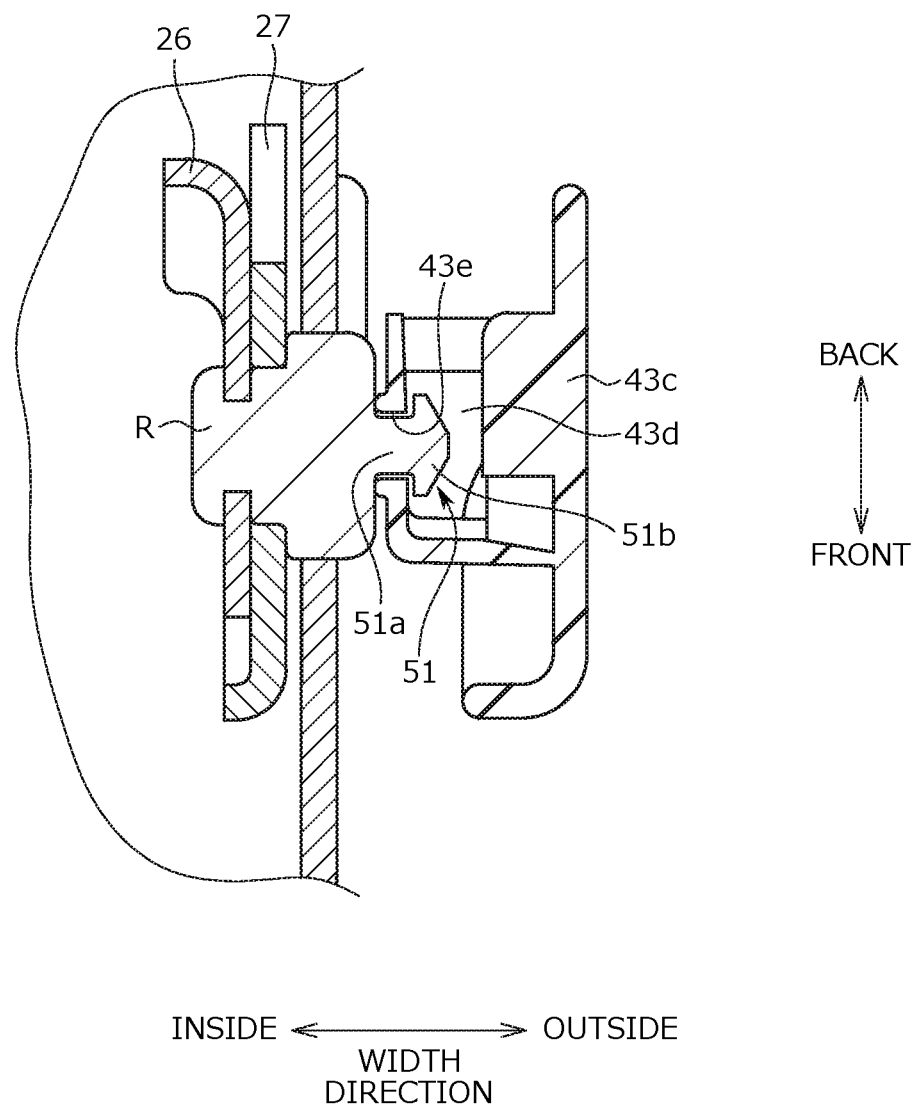
FIG. 19 is a view of a state when the protruding portion illustrated in FIG. 18 engages with the engagement portion illustrated in FIG. 17.

Meanwhile, a protruding portion 51 to be engaged with the above-described insertion hole 43*d* is provided at each link group 20. As illustrated in FIG. 18, the protruding portion 51 is provided at the rivet R (hereinafter referred to as a "second specified rivet R") coupling the sixth link 26 and the seventh link 27 together. As illustrated in FIG. 3, the second specified rivet R is thicker than top portions of other rivets R as in the specified rivet R described earlier. As illustrated in FIG. 19, the protruding portion 51 protrudes from a side surface (an end surface on the outside in the width direction) of a top portion of the second specified rivet R. Moreover, the protruding portion 51 includes a base portion 51*a* extending along the width direction, and a horizontal spinning top-shaped tip end portion 51*b*. Note that a configuration of each portion of the protruding portion 51 is similar to that of the protruding portion 50 described earlier, and therefore, description thereof will not be repeated.

The protruding portion 51 is positioned inward in the width direction with respect to the side wall portion 43*b* of the lower cover 43 in a state in which the lower cover 43 is set at the arrangement position thereof. Further, when the lower cover 43 is set, the protruding portion 51 faces the insertion hole formation portion 43*c* provided at the inner surface of the side wall portion 43*b* of the lower cover 43 in the width direction.

Then, the protruding portion 51 is inserted into the insertion hole 43*d* as illustrated in FIG. 19. More specifically, the lower cover 43 is set such that the tip end portion 51*b* of the protruding portion 51 faces the through-hole 43*e* formed at the inner portion of the insertion hole formation portion 43*c* in the width direction. Thereafter, the protruding portion 51 is inserted into the insertion hole 43*d* through the through-hole 43*e*. At this point, the protruding portion 51 is inserted into the insertion hole 43*d* while expanding the through-hole 43*e* by the tip end portion 51*b*. Note that in the present embodiment, the opening 43*f* is formed at the back end surface (precisely, the surface positioned at the back end surface of the ottoman 10 at the use position) of the insertion hole formation portion 43*c*, and therefore, the insertion hole 43*d* is easily expanded. As a result, the protruding portion 51 is smoothly inserted into the insertion hole 43*d*.

Eventually, the protruding portion 51 engages with the insertion hole 43*d* at the time of inserting the protruding portion 51 until the entirety of the tip end portion 51*b* is housed in the insertion hole 43*d*. That is, as illustrated in FIG. 19, the tip end portion 51*b* of the protruding portion 51 is locked at an edge portion of the insertion hole 43*d* of the insertion hole formation portion 43*c*. When reaching such a state, the lower cover 43 is attached to the protruding portion 51 provided at the second specified rivet R.

As described above, in the present embodiment, the protruding portion 51 protruding from the side surface (the outer end surface of the top portion in the width direction) of the second specified rivet R is inserted into the insertion hole 43*d* provided at the inner surface of the side wall portion 43*b* of the lower cover 43 in the width direction, and in this manner, the lower cover 43 is attached. With such a configuration, the process of attaching the lower cover 43 is easily performed. Moreover, the protruding portion 51 is provided outward in the width direction with respect to one (specifically, the seventh link 27), which is on the outside in the width direction, of the rotary links coupled together via the second specified rivet R. Thus, insertion of the protruding portion 51 into the insertion hole 43*d* (in other words, attachment of the lower cover 43) can be performed at the position not contacting the above-described rotary links. As a result, the lower cover 43 is properly attached not to interfere with the rotary operation of the above-described rotary links.

Attachment of the lower cover 43 will be described in more detail. In the present embodiment, the front wall portion 43*a* of the lower cover 43 is attached to the fourth coupling member 34 via a lower cover fixing bracket 37 illustrated in FIGS. 3 and 4. The lower cover fixing bracket 37 is welded to a front end portion (precisely, a portion positioned at the front end portion of the ottoman 10 at the use position) of the fourth coupling member 34. Moreover, a lower end portion of the front wall portion 43a of the lower cover 43, precisely the lower extending portion 43s, is fastened to a front surface of the lower cover fixing bracket 37 via tapping screws T. With such a configuration, the front wall portion 43a of the lower cover 43 is, when the ottoman 10 is at the use position, positioned forward with respect to the rotary links (specifically, the sixth link 26, the fourth link 24, and the fifth link 25) covered with the lower cover 43, thereby covering the rotary links from the front. Further, when the ottoman 10 is at the use position, the lower extending portion 43s provided at the lower end portion of the front wall portion 43a of the lower cover 43 is positioned forward with respect to the motor M, thereby covering the motor M from the front.

The configuration example of the vehicle seat S according to the present embodiment has been described so far, but other configurations than the above-described configuration are conceivable. For example, in the above-described embodiment, when the link cover 40 is attached, the protruding portions 50, 51 provided at the link group 20 are each inserted into the insertion holes 42d, 43d provided at the link cover 40, and in this manner, the link group 20 and the link cover 40 engage with each other. Note that other methods for engaging the protruding portion 50, 51 provided at the link group 20 with the engagement portion provided at the link cover 40 are conceivable. For example, it may be configured such that a claw portion is provided at the link cover 40 and is hooked on the protruding portion 50, 51.

Moreover, in the above-described embodiment, the link cover 40 has the front wall portion as the portion for covering the link group 20 from the front thereof, and the side wall portions as the portions for covering the link group 20 from the lateral side. Note that the present invention is not limited to such a configuration, and it may be configured such that only either one of the front wall portion or the side wall portions is provided.

Further, in the above-described embodiment, the protruding portions 50, 51 provided at the link group 20 are positioned inward in the width direction with respect to the side wall portions of the link cover 40. That is, in the above-described embodiment, the inside of the space positioned inward in the width direction with respect to the side wall portions of the link cover 40 is effectively utilized for insertion of the protruding portions 50, 51 into the insertion holes 42d, 43d. Note that a position relationship among the side wall portions of the link cover 40 and the protruding portions 50, 51 is not specifically limited, and the protruding portions 50, 51 may be provided at the substantially same position as those of the side wall portions of the link cover 40 in the width direction.

In addition, in the above-described embodiment, the protruding portion 50, 51 is shaped integrally with the rivet (the specified rivet R or the second specified rivet R). However, the protruding portion 50, 51 and the rivet R may be shaped as separate members, and thereafter, these members may be bonded together.

Moreover, in the above-described embodiment, the link cover 40 is also used as the cover for protecting the motor M, but the cover for protecting the motor M may be provided separately from the link cover 40.

<<Variation of Link Cover>>

Hereinafter, a variation of the above-described link cover will be described. For describing the link cover according to the variation, a problem regarding the link cover will be described. One example of the link cover includes a plate surface-shaped cover member described in JP2006-239291A. In the case of using this cover member, link members (a main link, a swing link, an operation link) forming a link mechanism and the periphery thereof are, without clearance, covered with the cover member in a state in which an ottoman is at a use position.

When the link members (operation bodies) are completely covered with the cover, adherence of a foreign substance to the link members can be properly reduced while it is difficult to check whether or not there is an abnormality in the link members or whether or not the operation bodies are properly assembled. In response to such a problem, a vehicle seat has been demanded, which is capable of easily checking the state of the link members (the operation bodies) operating together with the ottoman to move the ottoman even in the case of covering the link members with the cover.

The above-described problem is solved by a vehicle seat according to the following variation. The vehicle seat has an ottoman configured to support the lower thighs of a seated person in the front of a seat cushion, an operation body (specifically, a link group; the same shall apply hereinafter) configured to move together with the ottoman with the operation body being attached to the ottoman for moving the ottoman between a use position as a position when the ottoman supports the lower thighs and a housing position as a position when the ottoman is retracted from the use position toward a front end portion of the seat cushion, and a cover configured to cover, from the front and lateral sides, a portion of the operation body positioned forward with respect to the front end portion below the ottoman when the ottoman is at the use position. When the ottoman is at the use position, part of the portion is exposed at a position shifted from a position covered with the cover.

In the vehicle seat configured as described above, the portion (hereinafter also referred to as a "specified portion") of the operation body configured to operate together with the ottoman with the operation body being attached to the ottoman is covered with the cover, the specified portion being positioned forward with respect to the seat cushion below the ottoman. Meanwhile, when the ottoman is at the use position, part of the specified portion is exposed at the position shifted from the position covered with the cover. That is, when the ottoman is at the use position, part of the specified portion is visible. With such a configuration, even when the operation body is covered with the cover, part of the specified portion is viewed so that the state of the operation body can be easily checked.

Moreover, in the variation, the operation body includes multiple links. Of the multiple links, at least one link is positioned forward with respect to the front end portion below the ottoman, and the remaining links are, in the back of the front end of the seat cushion, positioned inward in the width direction with respect to a side cover provided at each end portion of the seat cushion in the width direction of the vehicle seat. According to such a configuration, the multiple links forming the operation body can be effectively covered with the cover and the side covers of the seat cushion. Meanwhile, when the ottoman is at the use position, part of at least one link is exposed at the position shifted from the position covered with the cover. Thus, even when the operation body is covered with the cover and the side covers of the seat cushion, part of the link (corresponding to part of the specified portion) is viewed so that the state of the operation body can be easily checked.

Further, in the variation, a hole is formed at a side wall portion of the cover for covering the operation body from the lateral side, and part of the above-described portion is at the position exposed through the hole when the ottoman is at the use position. In such a configuration, when the ottoman is at the use position, part of the specified portion is at the position exposed through the hole formed at the side wall portion of the cover. That is, part of the specified portion is visible from the lateral side of the cover through the hole. With such a configuration, the state of the operation body can be more easily checked.

In addition, in the variation, the hole is a slit formed at a position of the side wall portion adjacent to part of the above-described portion when the ottoman is at the use position. In such a configuration, the slit is formed at the position of the side wall portion of the cover adjacent to part of the specified portion when the ottoman is at the use position. Part of the specified portion is viewed through the slit. When the slit is formed as a viewing hole as described above, a visible area becomes more broader, and therefore, the state of the operation body can be much more easily checked.

Moreover, in the variation, the operation body includes a link configured to rotate about a rotary shaft whose axial direction is along the width direction of the vehicle seat, and the slit faces the link along the link when the ottoman is at the use position. In such a configuration, when the ottoman is at the use position, the slit faces the link forming the operation body along such a link. With such a configuration, part (corresponding to part of the specified portion) of the link forming the operation body is easily viewed through the slit, and as a result, checking of the state of the operation body is more facilitated.

Further, in the variation, part of the above-described portion at the position exposed through the slit when the ottoman is at the use position includes the rotary shaft. In such a configuration, part of the specified portion to be viewed includes the rotary shaft of the link. It is particularly important for proper operation of the operation body to check a rotary shaft assembly state included in the state of the operation body. With the above-described configuration, the rotary shaft assembly state can be easily checked, and therefore, the state of the operation body can be properly checked.

In addition, in the variation, the operation body includes a link configured to rotate about a rotary shaft whose axial direction is along the width direction of the vehicle seat, and the hole is a circular hole formed at a position of the side wall portion adjacent to the rotary shaft when the ottoman is at the use position. In such a configuration, the circular hole is formed at the position of the side wall portion of the cover adjacent to the rotary shaft of the link when the ottoman is at the use position. With such a configuration, the size of the viewing hole provided at the side wall portion of the cover can be reduced as much as possible while the rotary shaft assembly state particularly important for checking the state of the operation body can be easily checked.

Moreover, in the variation, a recessed portion recessed toward the link in the width direction is provided at the side wall portion, and the hole is formed at a bottom portion of the recessed portion at the side wall portion. In such a configuration, the viewing hole is formed at the bottom portion of the recessed portion provided at the side wall portion of the cover. With such a configuration, the hole is closer to the link (part of the specified portion), and therefore, part of the link is easily viewed through the hole. With the recessed portion, cover stiffness is improved. Further, the hole is formed at the bottom portion of the recessed portion at the side wall portion of the cover, and therefore, entering of a foreign substance through the hole is less caused as compared to the case of forming a hole at other portions than the recessed portion.

Further, in the variation, part of the above-described portion is exposed at the position shifted from the position covered with a front wall portion of the cover covering the above-described portion from the front when the ottoman is at the use position. In such a configuration, when the ottoman is at the use position, part of the specified portion is exposed at the position shifted from the position covered with the front wall portion of the cover. With such a configuration, part of the specified portion can be viewed from the front of the cover, and therefore, the state of the operation body can be more easily checked.

As described above, according to the vehicle seat of the above variation, part of the portion (the specified portion) of the operation body configured to move together with the ottoman with the operation body being attached to the ottoman can be viewed when the ottoman is at the use position, the specified portion being positioned forward with respect to the seat cushion below the ottoman. Thus, the state of the operation body can be easily checked even when the operation body is covered with the cover.

Moreover, in the variation, the operation body can be effectively covered with the cover and the side covers of the seat cushion while the state of the operation body can be easily checked.

Further, in the variation, part of the specified portion can be viewed from the lateral side of the cover through the hole formed at the side wall portion of the cover, and therefore, the state of the operation body can be more easily checked.

In addition, in the variation, the slit is formed as the viewing hole, and therefore, the state of the operation body can be much more easily checked.

Moreover, in the variation, the slit faces the link forming the operation body along such a link, and therefore, checking of the state of the operation body is further facilitated.

Further, in the variation, the assembly state of the rotary shaft of the link forming the operation body can be easily checked, and therefore, the state of the operation body can be properly checked.

In addition, in the variation, the circular viewing hole is formed at the position adjacent to the rotary shaft of the link when the ottoman is at the use position, and therefore, the size of the hole can be reduced as much as possible while the rotary shaft assembly state can be easily checked.

Moreover, in the variation, the viewing hole is formed at the bottom portion of the recessed portion provided at the side wall portion of the cover, and therefore, part of the link can be easily viewed through the hole. With the recessed portion, the cover stiffness is improved, and entering of the foreign substance through the hole is less caused.

Further, in the variation, part of the specified portion can be viewed from the front of the cover, and therefore, the state of the operation body can be more easily checked.

Hereinafter, a configuration of a link cover 140 according to the variation will be described with reference to FIGS. 20 to 26. Note that unless otherwise provided, the position, posture, etc. of each portion of the link cover 140 described below are in accordance with the contents when the ottoman 10 is at the use position.

Figure 20:
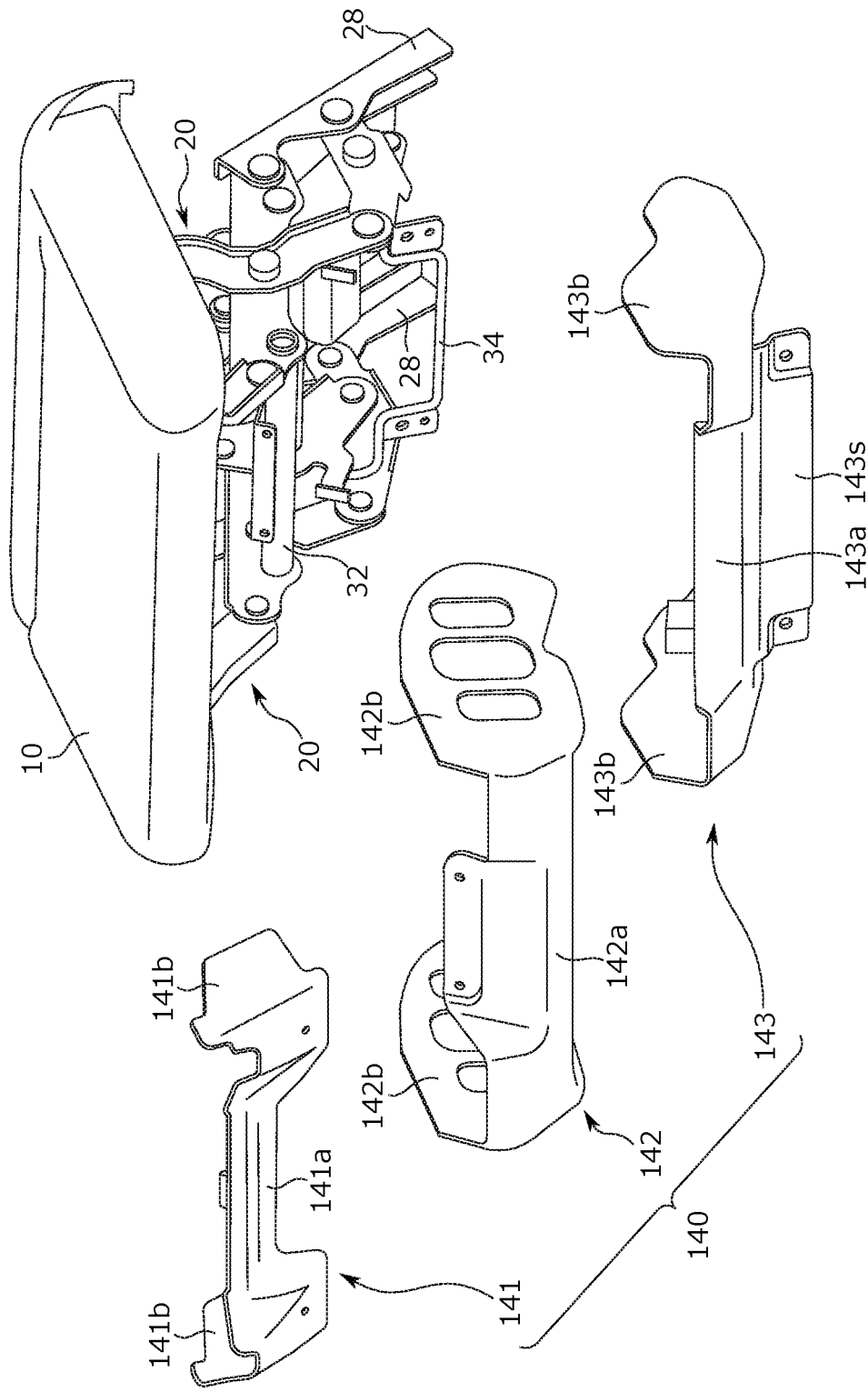
FIG. 20 is a perspective view of an ottoman and peripheral equipment thereof according to a variation.

The configuration of the link cover 140 according to the variation will be described. As illustrated in FIG. 20, the link cover 140 is divided into an upper cover 141, an intermediate cover 142, and a lower cover 143. Note that the link cover 140 is not limited to the link cover divided into multiple pieces, and may include a single piece.

The function and arrangement position of each of the upper cover 141, the intermediate cover 142, and the lower cover 143 according to the variation are similar to those of the embodiment described earlier. Moreover, the lower cover 143 includes a lower extending portion 143s as illustrated in FIG. 20. The lower extending portion 143s is positioned at a position in the front of the above-described motor M when the ottoman 10 is at the use position, thereby covering the motor M from the front. Thus, the lower cover 143 forms the link cover 140, and also functions as a motor protection cover.

The upper cover 141, the intermediate cover 142, and the lower cover 143 are attached to the coupling members coupling the links of the link groups 20. Specifically, the upper cover 141 is hooked on the first coupling member 31, and in this manner, is attached to the first coupling member 31. The intermediate cover 142 is attached to the second coupling member 32 via the intermediate cover fixing bracket 36. The lower cover 143 is attached to the fourth coupling member 34 via the lower cover fixing bracket 37. Further, the lower cover 143 engages with the top portion of the rivet R assembled to the middle portion of the seventh link 27 in the extension direction thereof, and in this manner, is attached to the seventh link 27.

Figure 21:
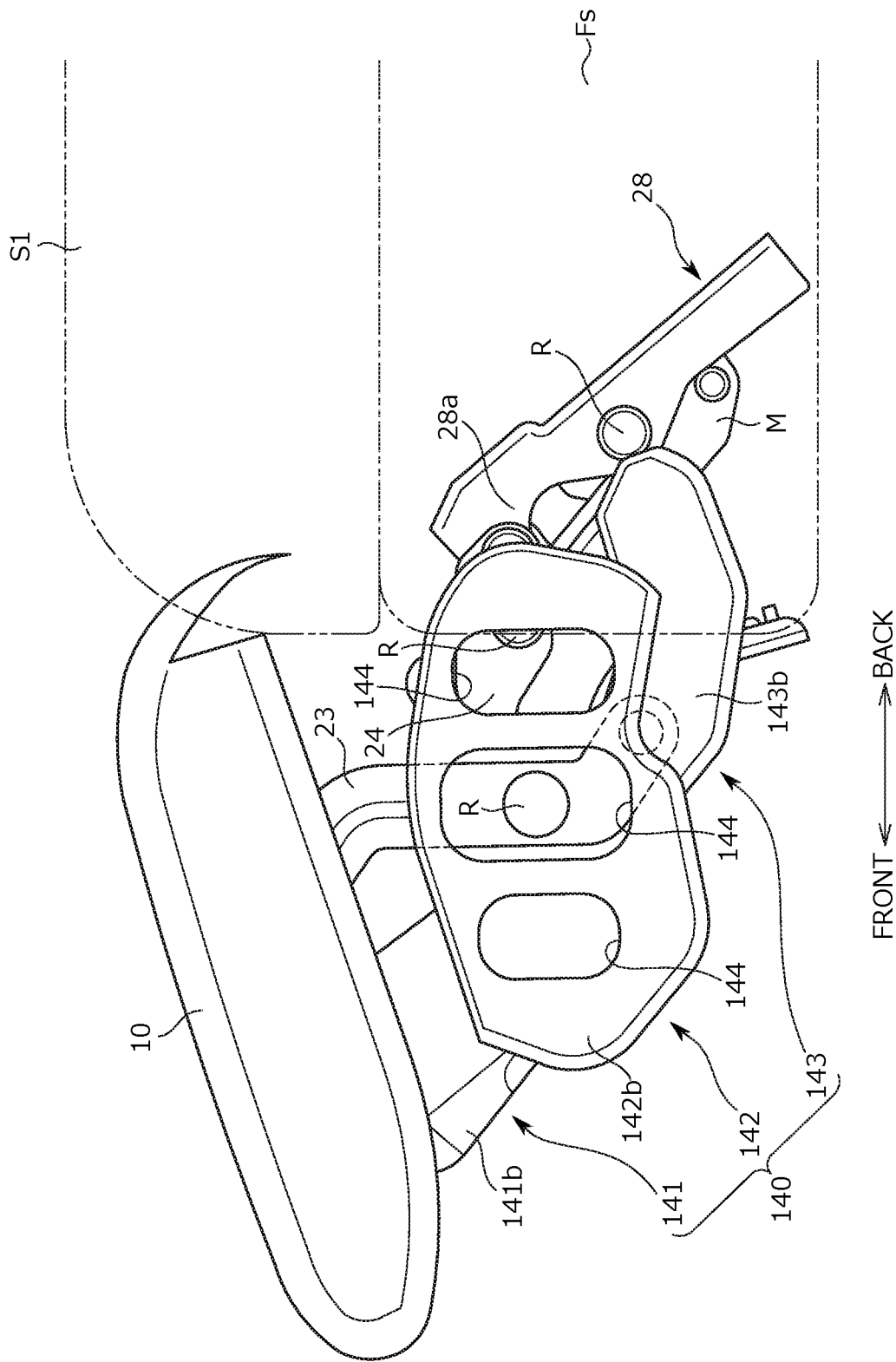
FIG. 21 is a side view of the ottoman and the peripheral equipment thereof according to the variation.

In the link cover 140 configured as described above, each piece of the link cover 140 operates in association with operation of the link group 20. That is, upon use of the ottoman 10, i.e., in a state in which the link group 20 expands, the link cover 140 also expands as illustrated in FIG. 21. On the other hand, upon housing of the ottoman 10, i.e., in a state in which the link group folds, the link cover 140 also folds (the pieces of the link cover 140 lie over one another). Moreover, the link cover 140 expands or folds without interfering with operation of the link group 20.

The link cover 140 covers a link (hereinafter referred to as a "specified link") of the link group 20 positioned forward with respect to the front end portion of the seat cushion S1 below the ottoman 10 when the ottoman 10 is at the use position. On the other hand, a link (hereinafter referred to as a "non-specified link") of the link group 20 positioned backward with respect to the front end of the seat cushion S1 when the ottoman 10 is at the use position is covered with the link cover 140, and is further covered with the side cover Fs of the seat cushion S1 positioned outward in the width direction with respect to the link cover 140.

A position relationship between the front end portion of the seat cushion S1 and the link cover 140 as described herein is a position relationship illustrated in FIG. 21. Specifically, the side cover Fs of the seat cushion S1 is arranged such that the front end portion thereof is at the substantially same position as those of a back end portion of the intermediate cover 142 and a back half portion of the lower cover 143 in the front-to-back direction. Note that in FIG. 21, an outer edge of the front end portion of the seat cushion S1 including the side cover Fs is indicated by a chain double-dashed line.

Each piece forming the link cover 140 includes a front wall portion 141a, 142a, 143a and side wall portions 141b, 142b, 143b as in the embodiment described earlier. Note that the side wall portions 141b, 142b, 143b somewhat extend in the front-to-back direction. Further, as illustrated in FIG. 21, a slit 144 as a link viewing hole is formed at the side wall portion 142b of the intermediate cover 142.

The slit 144 will be described in detail. The slit 144 is formed at a position of the side wall portion 142b of the intermediate cover 142 adjacent to the specified link, precisely a position adjacent to the middle portion (corresponding to "part" of the specified link) of the third link 23 in the extension direction thereof. The slit 144 is formed to face the middle portion of the third link 23 in the extension direction thereof along such a middle portion in a state in which the ottoman 10 is at the use position. Thus, when the ottoman 10 is at the use position, the middle portion of the third link 23 in the extension direction thereof is at a position exposed through the slit 144.

As described above, in the variation, when the ottoman 10 is at the use position, part (specifically, the middle portion of the third link 23 in the extension direction thereof) of the specified link is exposed at the position shifted from the position covered with the link cover 140. That is, when the ottoman 10 is at the use position, part of the specified link can be viewed from the lateral side through the slit 144. This can easily check the state of the link group 20 (precisely, the state of assembly of the third link 23). Moreover, in a state in which the ottoman 10 is at the use position, the slit 144 faces the middle portion of the third link 23 in the extension direction thereof along such a middle portion, and therefore, the state of assembly of the third link 23 is much more easily checked.

As an additional remark regarding the slit 144, the slit 144 is, in the present embodiment, formed such that the width thereof is greater than that of the third link 23. With this configuration, checking of the state of assembly of the third link 23 is further facilitated.

As illustrated in FIG. 21, the rivet R functioning as the rotary shaft of the third link 23 is included in the middle portion of the third link 23 in the extension direction thereof, the middle portion being at the position exposed through the slit 144 when the ottoman 10 is at the use position. This can easily check the state of assembly of the above-described rivet R. The state of assembly of the rivet R as the rotary shaft is particularly important in proper operation of the link group 20. Thus, when it is configured so that the state of assembly of the rivet R can be easily checked, the state of the link group 20 can be properly checked.

Note that in the present embodiment, the slit 144 is, as illustrated in FIG. 21, formed at the position of the side wall portion 142b of the intermediate cover 142 so that the third link 23 can be viewed, and other slits 144 are each formed in the front and back of such a position. Specifically, the back slit 144 faces the end portion (the back end portion) of the fourth link 24 in the extension direction thereof in a state in which the ottoman 10 is at the use position, and further faces the rivet R as the rotary shaft assembled to such an end portion. Thus, when the ottoman 10 is at the use position, the end portion of the fourth link 24 in the extension direction thereof and the rivet R assembled to such an end portion in the extension direction are at the positions exposed through the slits 144, and can be viewed from the lateral side. Thus, the assembly state for each of the fourth link 24 and the above-described rivet R can be easily checked, and as a result, the state of the link group 20 can be properly checked.

Note that the number of slits 144 and the formation positions of the slits 144 are not limited to the above-described contents, and can be set as necessary. In the above-described example, the slits 144 are formed only at the intermediate cover 142, but the present invention is not limited to such a configuration. The slits 144 may be also formed at the upper cover 141 or the lower cover 143. That is, as long as the formation positions of the slits 144 are set to suitable positions for viewing the viewing target link of the specified links of the link group 20 and satisfy such a condition, these formation positions can be set without limitation.

Figure 22:
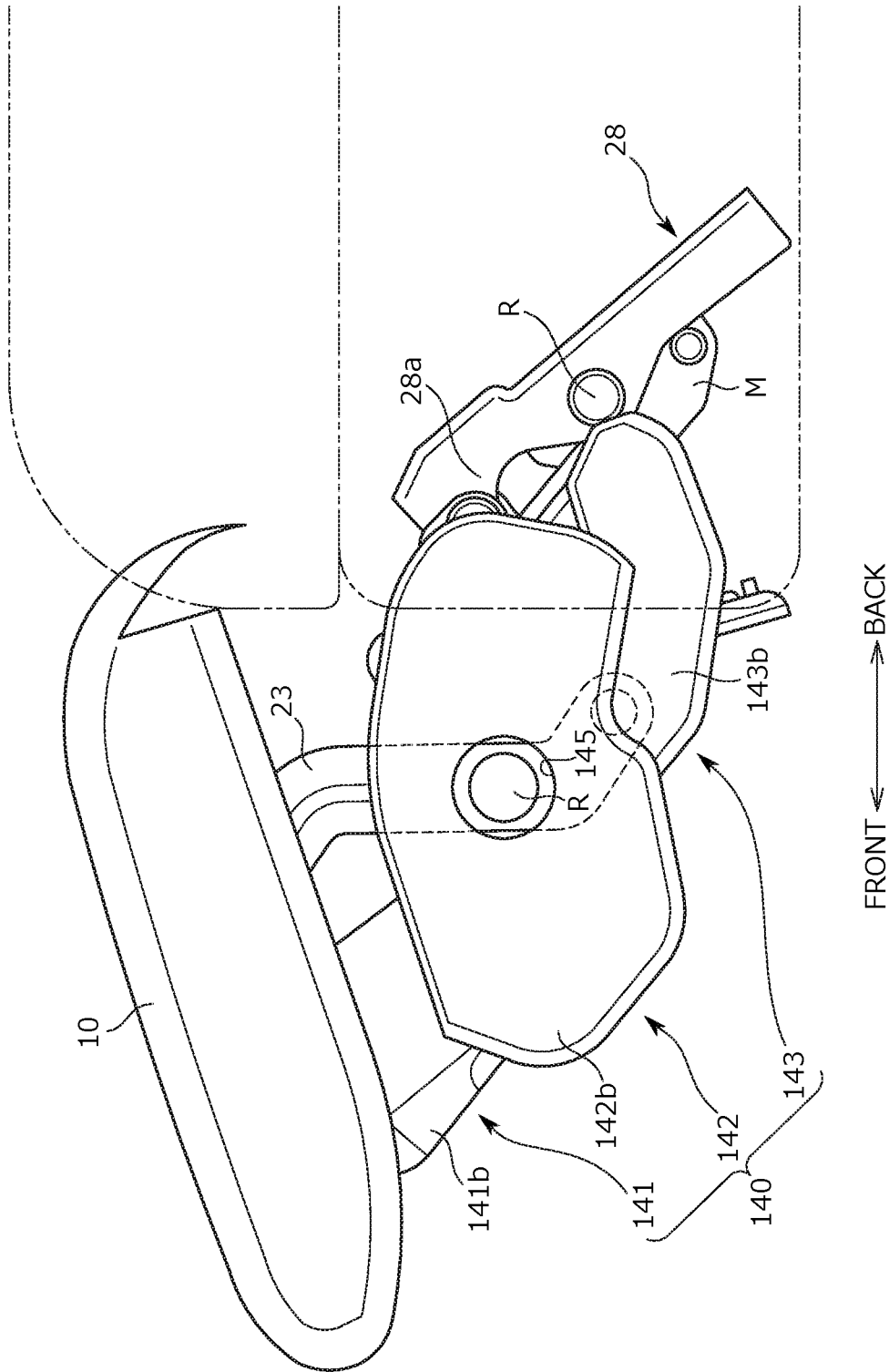
FIG. 22 is a view of a variation example of the variation.

In the configuration described so far, the slit 144 is formed as the link viewing hole. When the slit 144 is the link viewing hole as described above, the visible area becomes broader, and the state of the link group 20 can be much more easily checked. Note that the present invention is not limited to such a configuration, and a circular hole 145 may be formed as the link viewing hole instead of the slit 144, as illustrated in FIG. 22. FIG. 22 is a view of one of variation examples of the variation, and corresponds to FIG. 21.

The configuration in which the circular hole 145 is formed as the link viewing hole, i.e., the configuration illustrated in FIG. 22, will be described. The above-described circular hole 145 is formed at the side wall portion 142b of the intermediate cover 142. More specifically, when the ottoman 10 is at the use position, the above-described circular hole 145 is formed at the position of the side wall portion 142b adjacent to the rivet R assembled to the middle portion of the third link 23 in the extension direction thereof. Moreover, the circular hole 145 is formed such that the diameter thereof is slightly larger than the outer diameter of the top portion of the rivet R.

With the above-described configuration, the size of the link viewing hole can be reduced as much as possible while the assembly state of the above-described rivet R can be properly and easily checked. Note that the formation position of the circular hole 145 and the number of circular holes 145 are not limited to the above-described contents, and can be set as necessary. Moreover, the present invention is not limited to the configuration in which the circular hole 145 is formed only at the intermediate cover 142, and the circular hole 145 may be also formed at the upper cover 141 or the lower cover 143. That is, the formation position of the circular hole 145 may be set to a suitable position for viewing the viewing target link of the specified links of the link group 20, and can be set without limitation as long as such a position satisfies the above-described condition.

Figure 23:
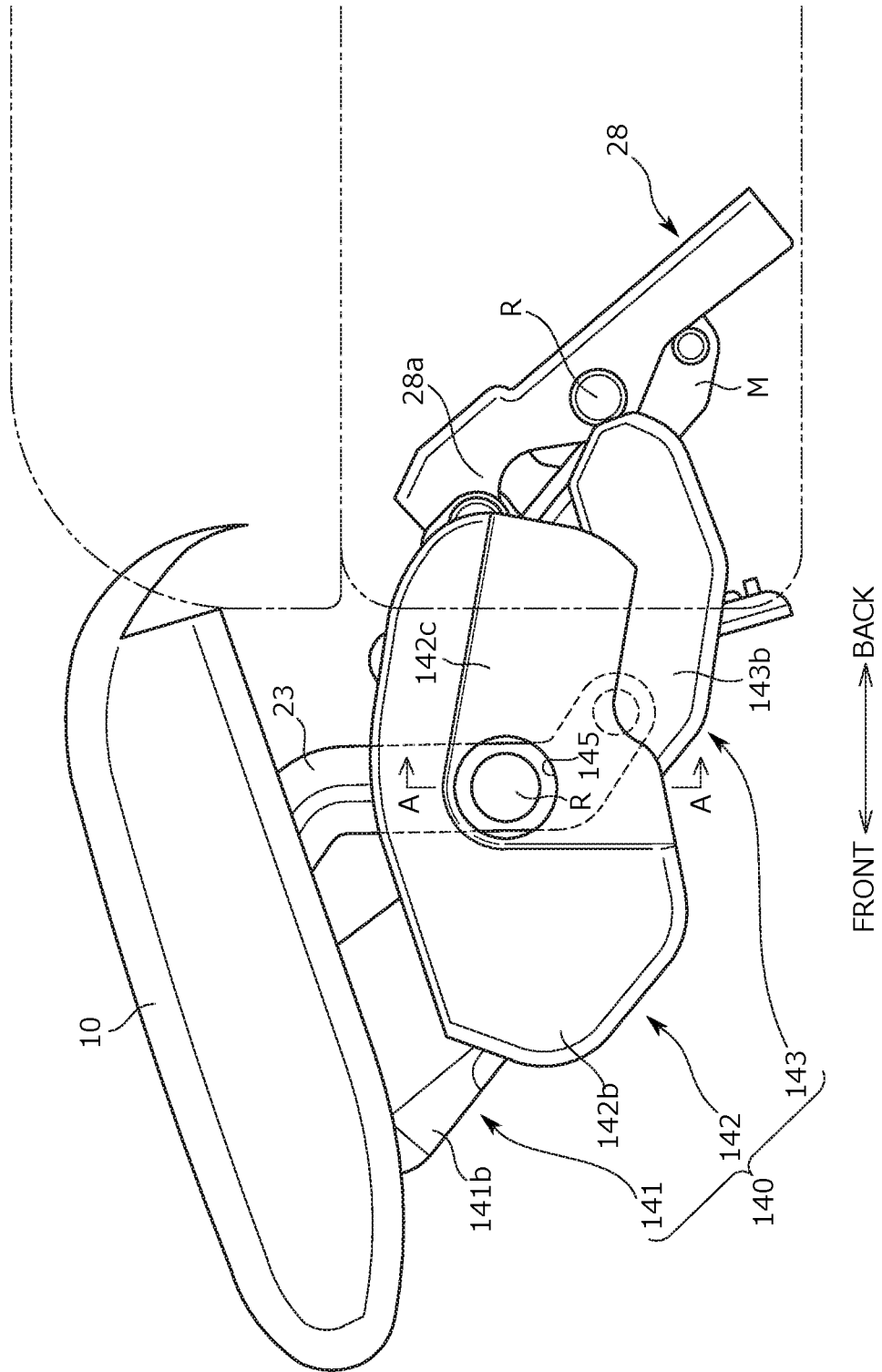
FIG. 23 is a view of a second variation example of the variation.
Figure 24:
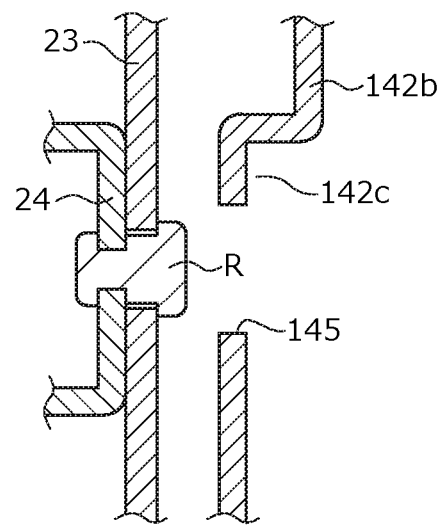
FIG. 24 is a schematic sectional view along an A-A line of FIG. 23.

In the configuration described so far, the side wall portion 142b of the intermediate cover 142 forms a flat wall, and the link viewing hole is formed at the side wall portion 142b. Note that the present invention is not limited to such a configuration, and it may be configured such that the side wall portion 142b has a step as illustrated in FIGS. 23 and 24. FIG. 23 is a view of a second variation example of the variation, and corresponds to FIG. 21. FIG. 24 is a schematic sectional view along an A-A line of FIG. 23.

The configuration in which the side wall portion 142b has the step will be described with reference to FIGS. 23 and 24. A region of the side wall portion 142b extending from a center portion to a lower back end portion forms a recessed portion 142c recessed inward in the width direction. The recessed portion 142c is closer to the link group 20 than other portions of the side wall portion 142b than the recessed portion 142c (i.e., the recessed portion 142c is recessed toward the link group 20 in the width direction). As illustrated in FIGS. 23 and 24, the circular hole 145 as the link viewing hole is formed at a bottom portion (a portion positioned on the innermost side in the width direction) of the recessed portion 142c of the side wall portion 142b.

With the above-described configuration, the link viewing hole is closer to part (specifically, the middle portion of the third link 23 in the extension direction thereof) of the specified link, and therefore, part of the link is easily viewed through the hole. Moreover, the recessed portion 142c is provided at the side wall portion 142b so that stiffness of the intermediate cover 142 including the side wall portions 142b is improved. Further, the link viewing hole is formed at the bottom portion of the recessed portion 142c of the side wall portion 142b. That is, the formation position of the hole is on the inside in the width direction as illustrated in FIG. 24. Thus, entering of a foreign substance through the hole is less caused as compared to the case of forming the link viewing hole at other portions than the recessed portion 142c.

Figure 25:
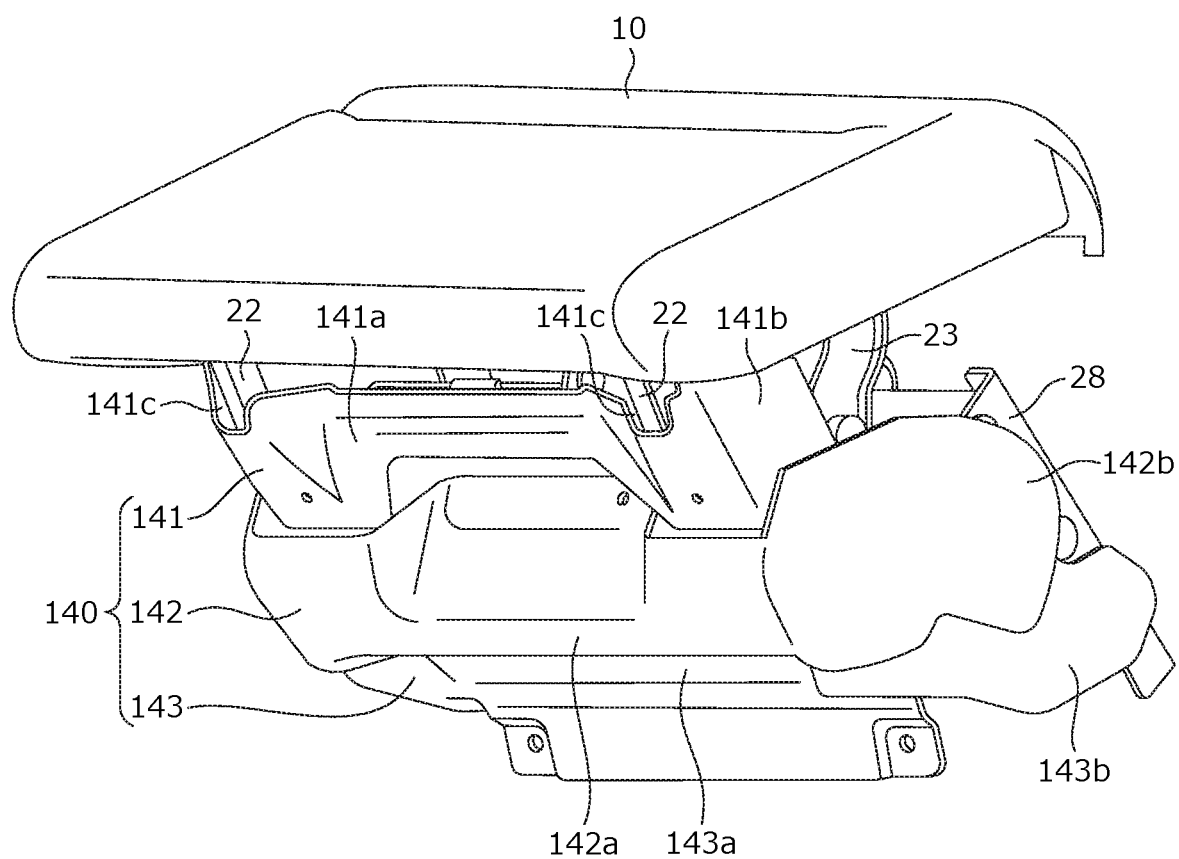
FIG. 25 is a view of a third variation example of the variation.

In the configuration described so far, the link viewing hole is formed at the side wall portion (precisely, the side wall portion 142b of the intermediate cover 142) of the link cover 140. That is, the above-described embodiment has described the configuration in which part of the specified link is viewed from the lateral side through the link viewing hole. Note that the present invention is not limited to such a configuration, and part of the specified link may be viewed from the front. Hereinafter, such a configuration will be described with reference to FIG. 25. FIG. 25 is a view of a third variation example of the variation, and is a perspective view when the ottoman 10 and the link cover 140 are viewed diagonally from the front.

The configuration of viewing part of the specified link from the front may include, for example, a configuration in which a cutout 141c for exposing part of the specified link is provided at the front wall portion of the link cover 140, specifically an upper end portion of the front wall portion 141a of the upper cover 141, as illustrated in FIG. 25. Note that the configuration for exposing part of the specified link may be other configurations than the cutout 141c, and may be a hole (peephole), for example. In the configuration illustrated in FIG. 25, when the ottoman 10 is at the use position, part (specifically, the upper end portion of the second link 22) of the specified link is exposed through the above-described cutout 141c. That is, part of the specified link is at the position shifted from the position covered with the front wall portion 141a of the upper cover 141, and therefore, can be viewed from the front. With such a configuration, the assembly state of the specified link can be also viewed from the front.

Figure 26:
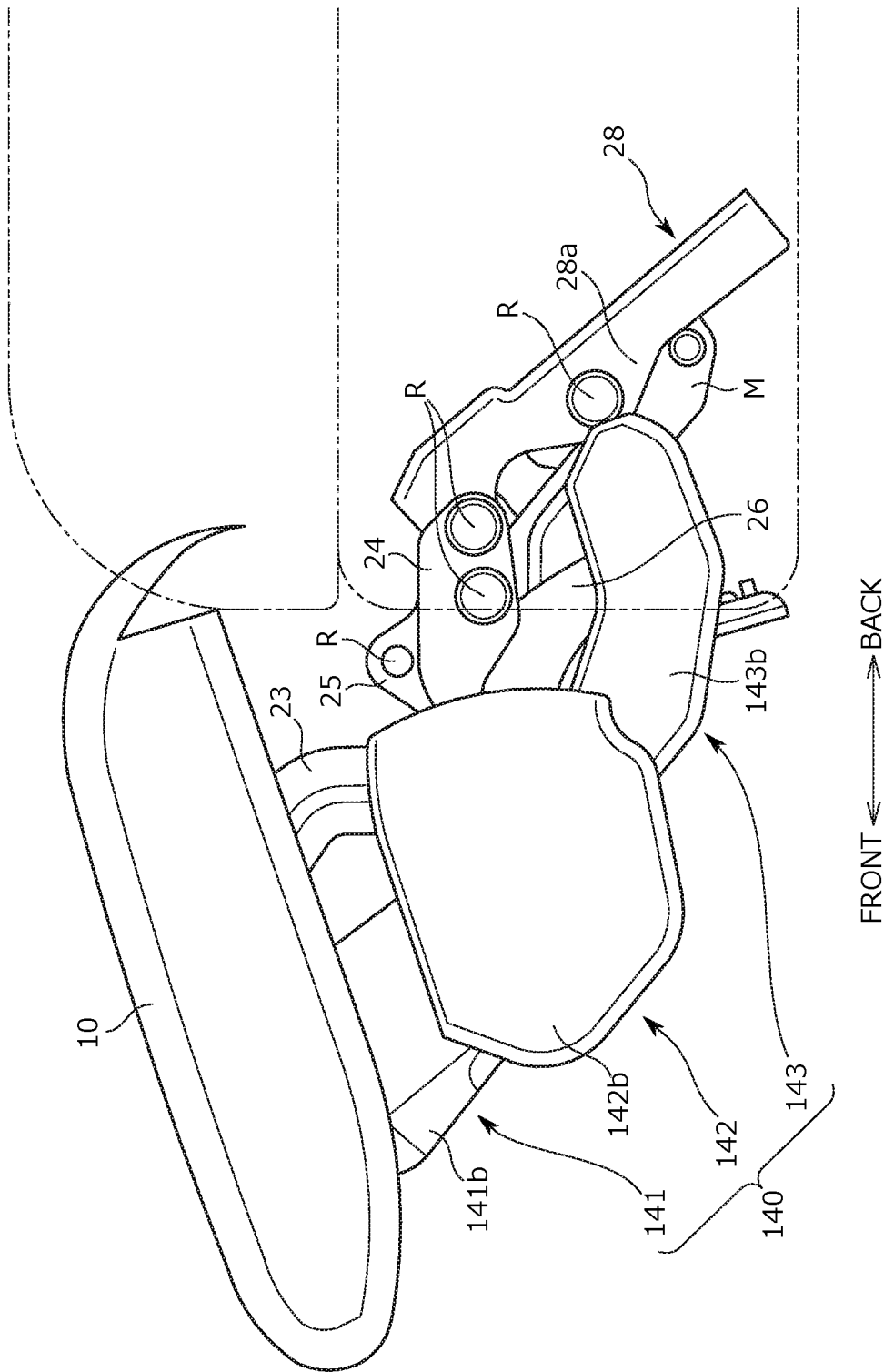
FIG. 26 is a view of a fourth variation example of the variation.

In the configuration described so far, the peephole or the cutout for exposing the specified link is provided at the link cover 140 to check the assembly state of the specified link. Note that the present invention is not limited to such a configuration. For example, as illustrated in FIG. 26, an open space such as a clearance may be formed around the link cover 140 due to the shape of the link cover 140, and part of the specified link may be exposed through such a space. FIG. 26 is a view of a fourth variation example of the variation, and corresponds to FIG. 21. The configuration illustrated in FIG. 26 will be described. No link viewing hole is provided at the side wall portion 142b of the intermediate cover 142, but the length of the side wall portion 142b in the front-to-back direction is shorter. Of the specified link, a portion (e.g., the end portion of the fourth link 24 in the extension direction thereof or the middle portion of the sixth link 26) positioned backward with respect to the side wall portion 142b of the intermediate cover 142 is exposed at the position shifted from the position covered with the side wall portion 142b of the intermediate cover 142. Thus, the portion of the specified link positioned backward with respect to the side wall portion 142b of the intermediate cover 142 can be viewed from the lateral side.

REFERENCE SIGNS LIST

10: ottoman
20: link group (operation body)

21: first link
22: second link (first opposing link)
23: third link (the other crosslink)
24: fourth link (one crosslink)
25: fifth link (second sub-link, auxiliary link)
26: sixth link (first sub-link)
27: seventh link (second opposing link)
28: attachment bracket
31: first coupling member
32: second coupling member
32x: another tip end receiver
33: third coupling member (coupling member)
33a: tip end receiver (drive force receiver)
34: fourth coupling member
40: link cover (cover)
41: upper cover
42: intermediate cover
43: lower cover
41a, 42a, 43a: front wall portion
41b, 42b, 43b: side wall portion
41c: locking groove formation portion
41d: locking groove
42c, 43c: insertion hole formation portion
42d, 43d: insertion hole
42e, 43e: through-hole
42f, 43f: opening
43s: lower extending portion
50, 51: protruding portion
50a, 51a: base portion
50b, 51b: tip end portion
140: link cover (cover)
141: upper cover
142: intermediate cover
143: lower cover
141a, 142a, 143a: front wall portion
141b, 142b, 143b: side wall portion
141c: cutout
142c: recessed portion
143s: lower extending portion
144: slit (hole)
145: circular hole (hole)
R: rivet (rotary shaft, second rotary shaft)
M: motor
Ms: advancing/retreating member
RA0: comparative trajectory
RA1: first trajectory
RA2: second trajectory
RA3: third trajectory
S: vehicle seat
S1: seat cushion
S2: seat back
S3: headrest

The invention claimed is:
1. A conveyance seat comprising:
multiple links configured to move to switch a state of a seat main body;
an advancing/retreating member configured to move straight while advancing/retreating for moving each link; and
a drive force receiver attached to a tip end portion of the advancing/retreating member and configured to receive drive force of the advancing/retreating member to transmit the drive force to the multiple links,
wherein the multiple links include
two crosslinks crossing each other in a state allowing relative rotation, and
an auxiliary link assembled to one crosslink of the two crosslinks via a rotary shaft and configured to swing by the transmitted drive force, and
when a rotation trajectory upon rotation of a fixing portion, which is fixed to the drive force receiver, of the tip end portion of the advancing/retreating member about a point of support in rotation is a first trajectory and a rotation trajectory upon rotation of a portion of the auxiliary link about the rotary shaft is a second trajectory, in a case where both of the first trajectory and the second trajectory are projected onto a virtual plane perpendicular to an axial direction of the rotary shaft, both of the first trajectory and the second trajectory cross each other.
2. The conveyance seat according to claim 1, wherein
the multiple links move to switch a state of an ottoman forming the seat main body and configured to support a lower thigh of a seated person between a use state and a housing state, and groups of the multiple links are, one by one, arranged with a clearance in a width direction of the conveyance seat.
3. The conveyance seat according to claim 2, wherein
the multiple links include
a first opposing link assembled to the one crosslink and facing the other crosslink of the two crosslinks along the other crosslink when the state of the ottoman is the use state,
a second opposing link assembled to the other crosslink and facing the one crosslink along the one crosslink when the state of the ottoman is the use state,
a first sub-link coupled to the drive force receiver and configured to swing by the transmitted drive force, and
a second sub-link as the auxiliary link positioned adjacent to the first sub-link in the width direction and configured to swing together with the first sub-link.
4. The conveyance seat according to claim 3, wherein
the first sub-link is assembled to the second opposing link via a second rotary shaft, and
when a rotation trajectory upon rotation of a portion, which is adjacent to the fixing portion in the width direction, of the first sub-link about the second rotary shaft is a third trajectory, in a case where the first trajectory, the second trajectory, and the third trajectory are projected onto the virtual plane, the first trajectory and the third trajectory partially overlap with each other, and the second trajectory crosses an area of the first trajectory overlapping with the third trajectory.
5. The conveyance seat according to claim 3, further comprising:
a coupling member configured to couple the first sub-link of the multiple links arranged on one end side in the width direction and the first sub-link of the multiple links arranged on the other end side in the width direction,
wherein the drive force receiver is fixed onto an outer peripheral surface of the coupling member.
6. The conveyance seat according to claim 3, further comprising:
a motor configured to advance/retreat the advancing/retreating member,
wherein the advancing/retreating member is a rod-shaped member, the advancing/retreating member moving straight diagonally upward to a front upon advancing and moving straight diagonally downward to a back upon retreating.

7. The conveyance seat according to claim 6, wherein
when the state of the ottoman is the use state, the drive force receiver is positioned upward with respect to the motor.

8. The conveyance seat according to claim 6, further comprising:
a one-end-side attachment bracket arranged on one end side in the width direction and provided to attach the multiple links to a seat cushion;
an other-end-side attachment bracket arranged on the other end side in the width direction and provided to attach the multiple links to the seat cushion; and
a motor fixing bracket arranged between the one-end-side attachment bracket and the other-end-side attachment bracket in the width direction,
wherein the motor is fixed to the motor fixing bracket.

* * * * *